United States Patent [19]
Kon et al.

[11] Patent Number: 5,751,916
[45] Date of Patent: May 12, 1998

[54] BUILDING MANAGEMENT SYSTEM HAVING SET OFFSET VALUE LEARNING AND SET BIAS VALUE DETERMINING SYSTEM FOR CONTROLLING THERMAL ENVIRONMENT

[75] Inventors: Akihiko Kon, Tokyo; Akihiko Naruse, Kanagawa, both of Japan

[73] Assignee: Yamatake-Honeywell Co. Ltd., Japan

[21] Appl. No.: 622,923

[22] Filed: Mar. 27, 1996

Related U.S. Application Data

[63] Continuation of Ser. No. 237,128, May 3, 1994, abandoned.
[51] Int. Cl.$^6$ .................................. F24E 13/00
[52] U.S. Cl. .................. 395/77; 395/3; 364/550
[58] Field of Search .................. 395/77, 3; 364/550

[56] References Cited

U.S. PATENT DOCUMENTS

| | | | |
|---|---|---|---|
| 4,873,649 | 10/1989 | Grald et al. | 364/505 |
| 4,897,798 | 1/1990 | Cler | 364/505 |
| 5,132,681 | 7/1992 | Yabe | 340/825.55 |
| 5,145,112 | 9/1992 | Ueda | 236/49.3 |
| 5,148,977 | 9/1992 | Hibino et al. | 236/49.3 |
| 5,170,935 | 12/1992 | Federspiel et al. | 236/44 C |
| 5,193,742 | 3/1993 | Byun | 236/49.3 |
| 5,244,148 | 9/1993 | Vandermeyder | 236/46 R |
| 5,291,748 | 3/1994 | Ueda | 62/179 |

FOREIGN PATENT DOCUMENTS

| | | |
|---|---|---|
| 0471857 | 2/1992 | European Pat. Off. . |
| 0488150 | 6/1992 | European Pat. Off. . |
| 0 495 118 A1 | 7/1992 | European Pat. Off. . |
| 92307438 | 8/1992 | European Pat. Off. . |
| WO89/12269 | 12/1989 | WIPO . |

OTHER PUBLICATIONS

European Search Report—App No. 94106912.2; Feb. 21, 1995.

European Search Report—App No. 96112497.1; Aug. 28, 1996.

Electronic Engineering, "Fuzzy Rules From Neural Nets", Jul. 1993; pp. 43–50.

Dynamic Compensatory Pattern Matching in a Fuzzy Rule–Based Control System; Department of Electrical Engineering and Computer Sciences University of California.

Neurocomputational Approach to Solve a Convexly Combined Fuzzy Relational Equation With Generalized Connectives; Myung–Geun Chun and Zeungnam Bien.

Neural Networks in Japan; Kazuo Asakawa and Hideyuki Takagi.

*Primary Examiner*—Krisna Lim
*Attorney, Agent, or Firm*—VanOphem Meehan VanOphem, P.C.

[57] ABSTRACT

A building management set value decision support apparatus includes a thermal environment index calculation/display section, and a pseudo-thermal environment index calculation/display section. The thermal environment index calculation/display section calculates/displays the current value of a thermal environment index on the basis of the measured value of an air-conditioning control target and the measured or preset values of other predetermined parameters. The pseudo-thermal environment index calculation/display section calculates/displays a pseudo-thermal environment index on the basis of a supplied building management set value and the measured or preset values of the other predetermined parameters. A set value learning apparatus, a set value determining apparatus, and a neural network operation apparatus are also disclosed.

14 Claims, 27 Drawing Sheets

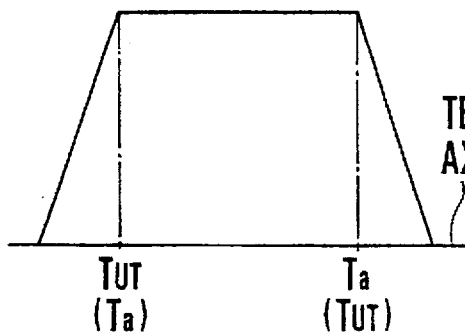
F I G.5(a)
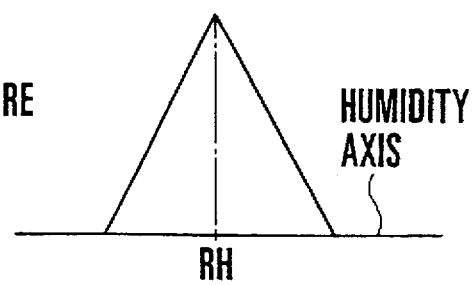
F I G.5(b)
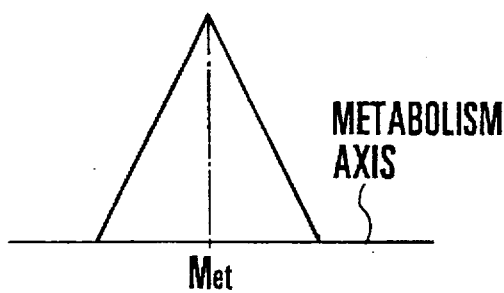
F I G.5(c)
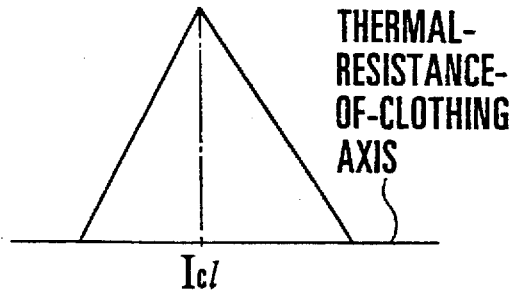
F I G.5(d)

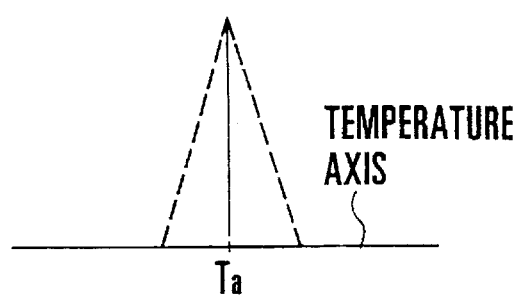
F I G. 9(a)
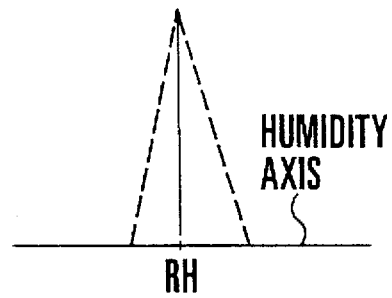
F I G. 9(b)
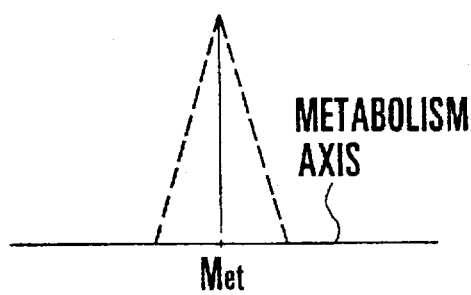
F I G. 9(c)
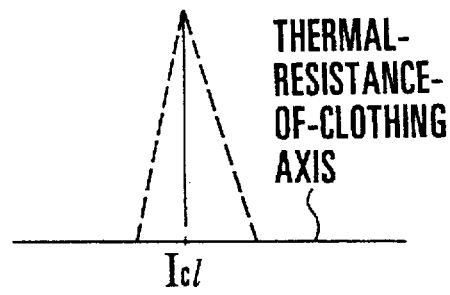
F I G. 9(d)

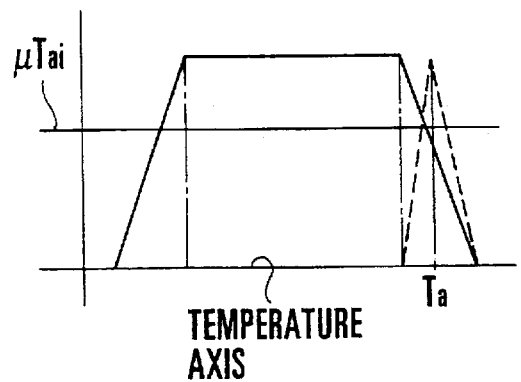
F I G. 10 (a)
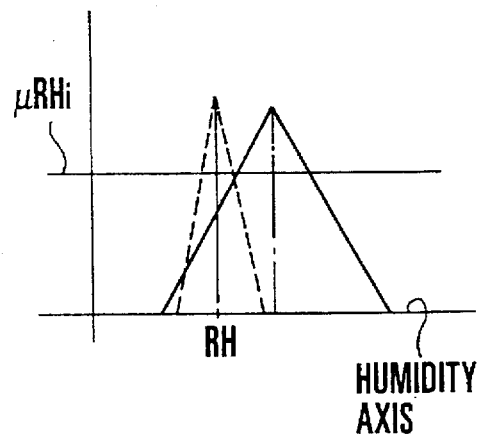
F I G. 10 (b)
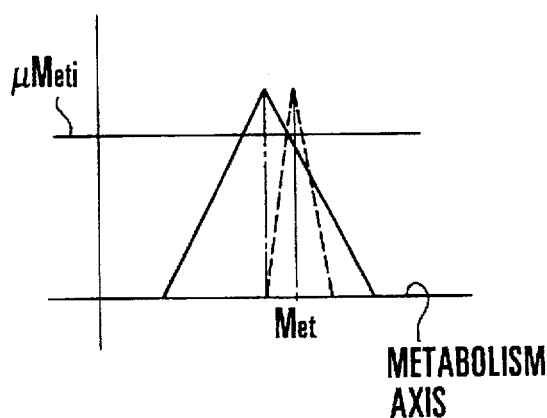
F I G. 10 (c)
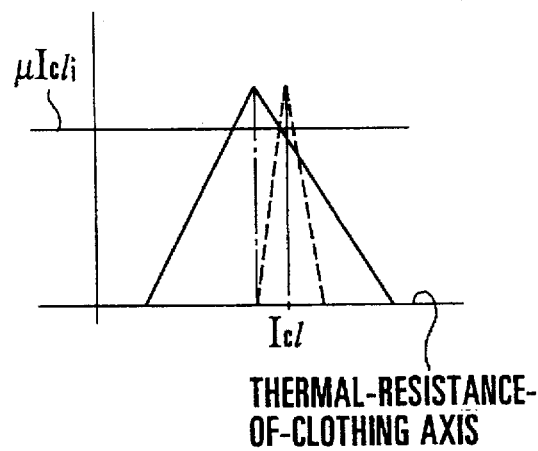
F I G. 10 (d)

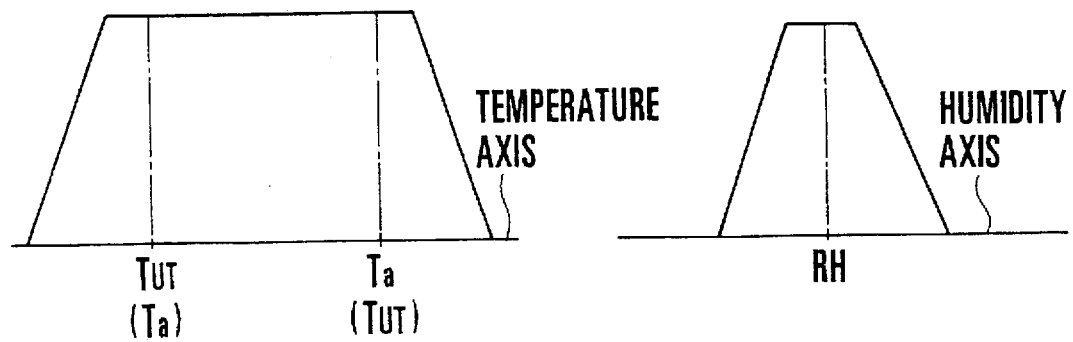
F I G.15(a)　　　　　F I G.15(b)
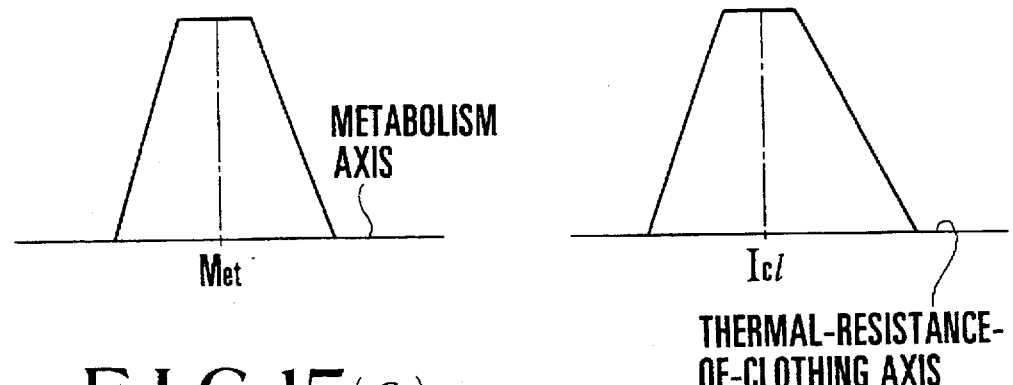
F I G.15(c)　　　　　F I G.15(d)
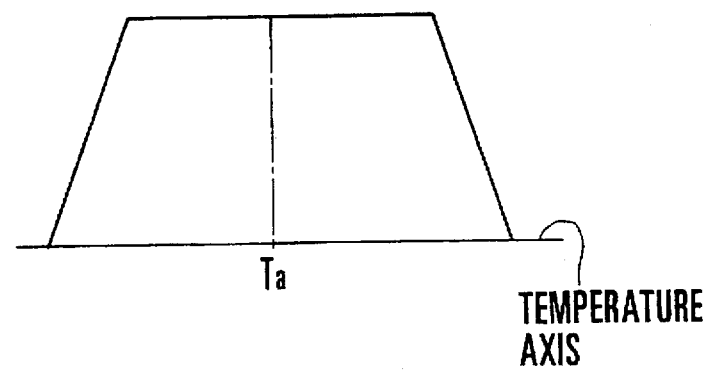
F I G.15(e)

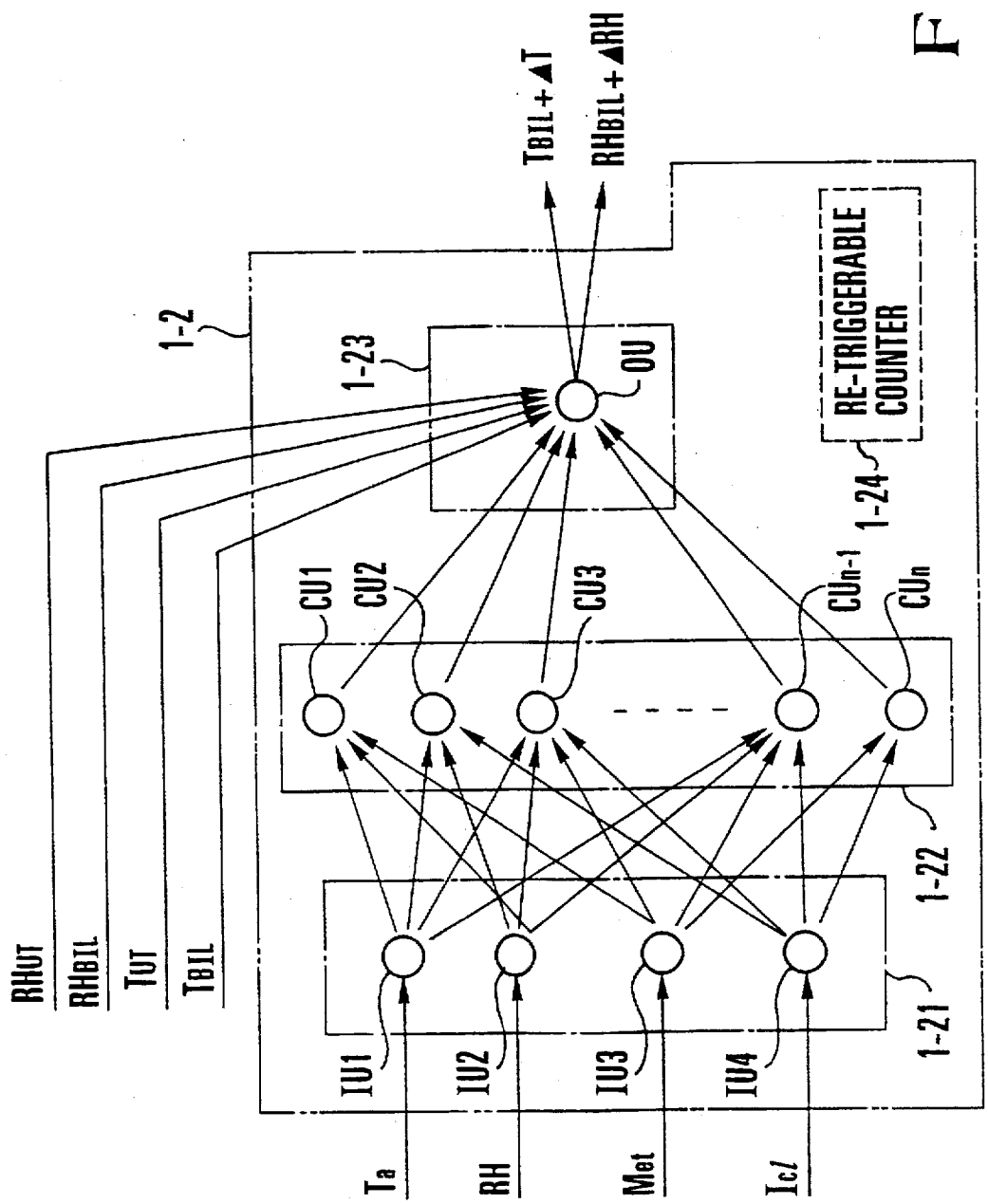

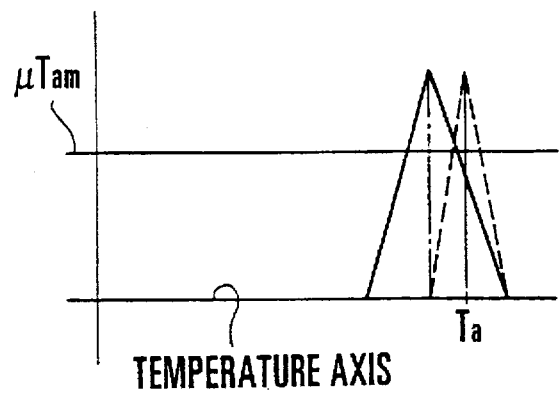
F I G. 25(a)
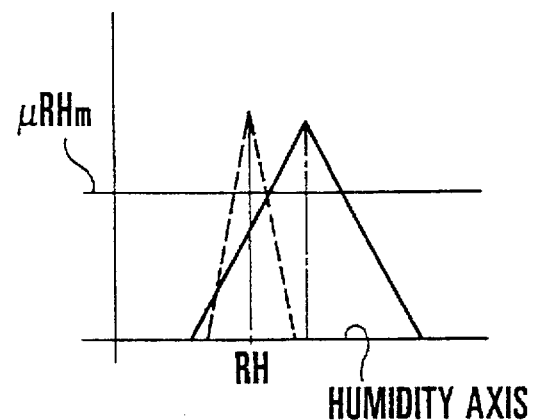
F I G. 25(b)
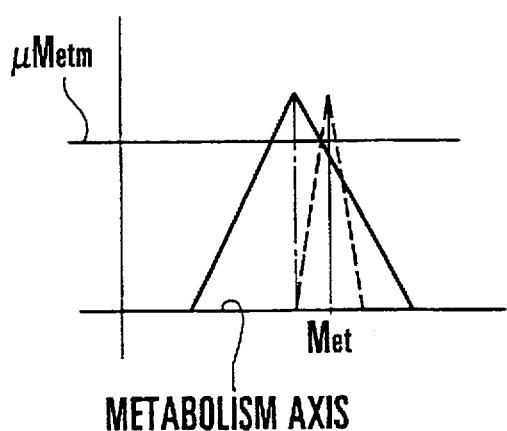
F I G. 25(c)
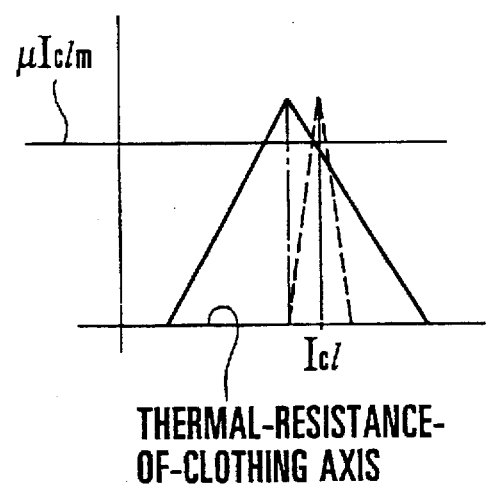
F I G. 25(d)

TEMPERATURE AXIS

HUMIDITY AXIS

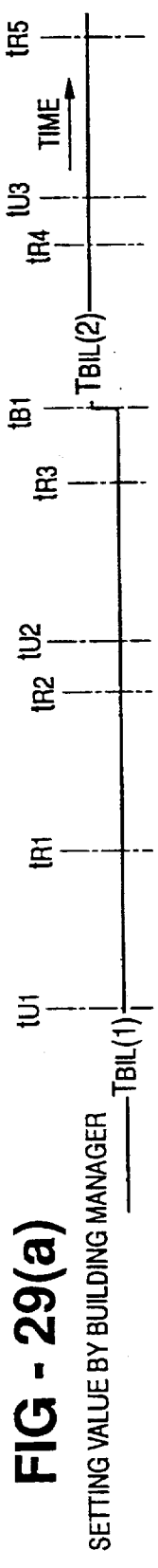

FIG - 29(a)
SETTING VALUE BY BUILDING MANAGER

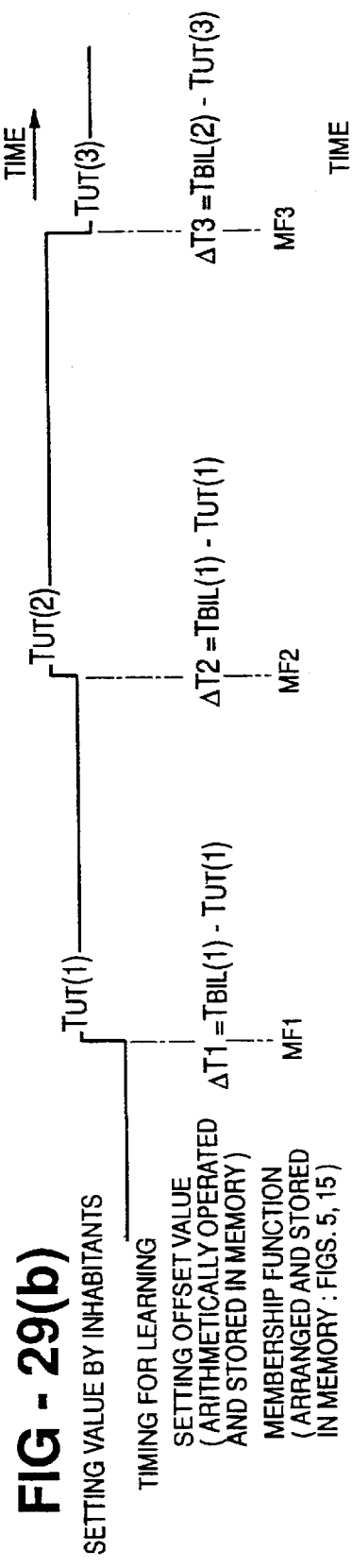

FIG - 29(b)
SETTING VALUE BY INHABITANTS

TIMING FOR LEARNING
SETTING OFFSET VALUE
(ARITHMETICALLY OPERATED AND STORED IN MEMORY)
MEMBERSHIP FUNCTION
(ARRANGED AND STORED IN MEMORY : FIGS. 5, 15)

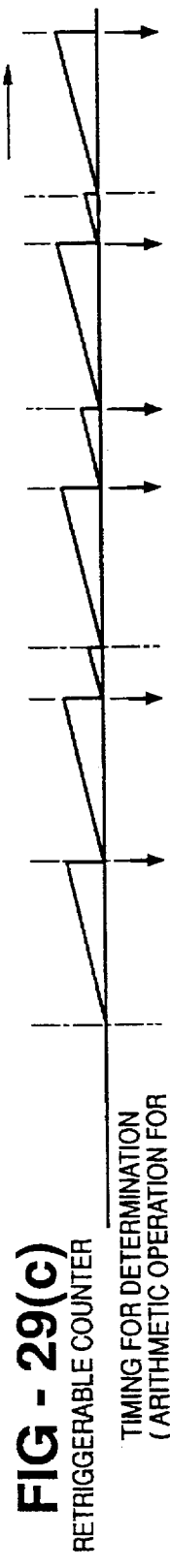

FIG - 29(c)
RETRIGGERABLE COUNTER

TIMING FOR DETERMINATION
(ARITHMETIC OPERATION FOR ACTIVATED VALUE THROUGH OPERATION FOR FUZZY MOTION

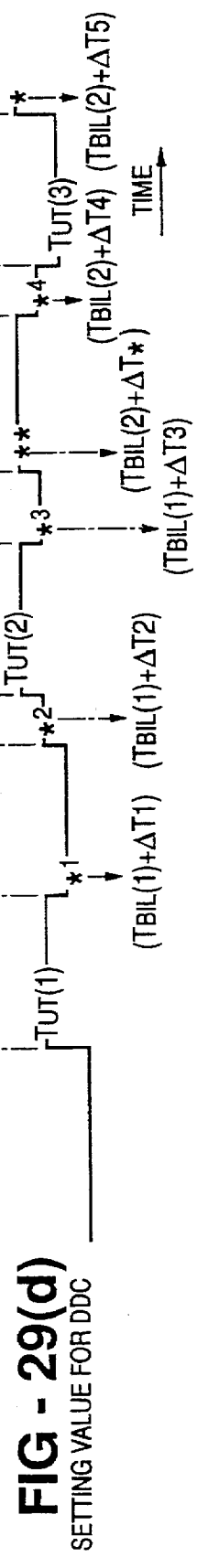

FIG - 29(d)
SETTING VALUE FOR DDC

MEMBERSHIP FUNCTION : INPUT FIG. 9
SETTING BIAS VALUE OBTAINED

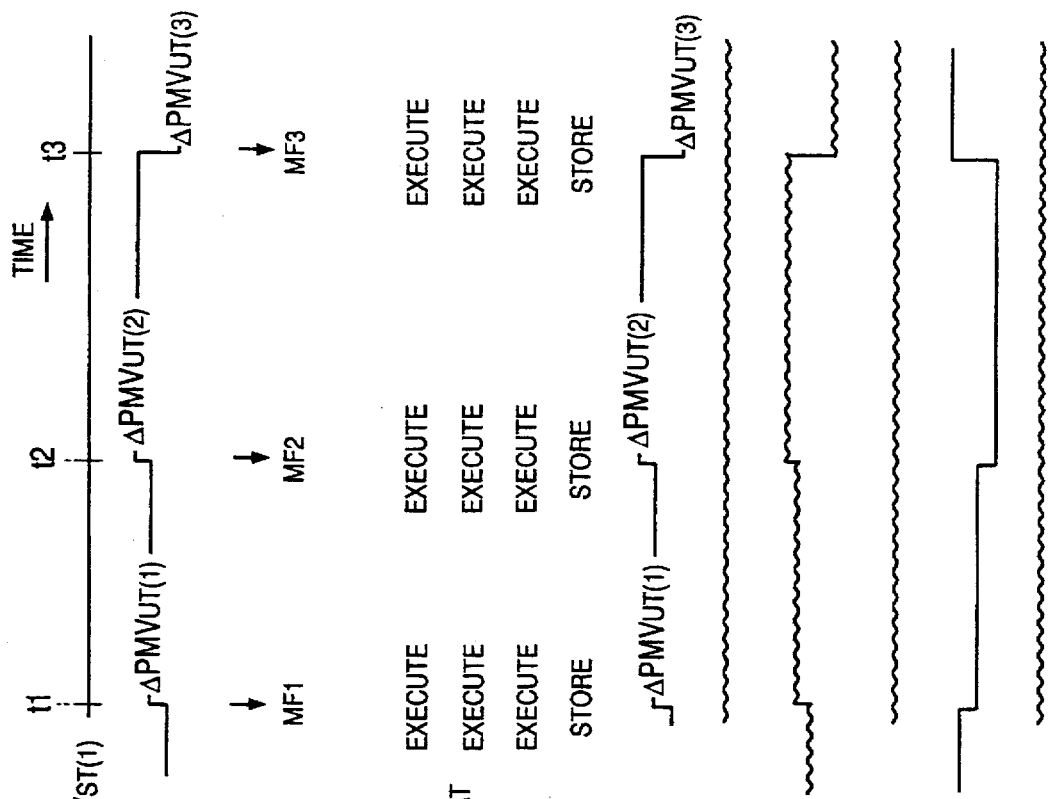

5,751,916

BUILDING MANAGEMENT SYSTEM HAVING SET OFFSET VALUE LEARNING AND SET BIAS VALUE DETERMINING SYSTEM FOR CONTROLLING THERMAL ENVIRONMENT

This is a continuation, of application Ser. No. 08/237, 128, filed May 3, 1994 now abandoned.

BACKGROUND OF THE INVENTION

The present invention relates to a building management set value decision support apparatus, a set offset value learning apparatus, a set offset value learning/set bias value determining apparatus, a neural network operation apparatus, and an air-conditioning environment measurement apparatus which can be suitably used for air-conditioning control.

A conventional air-conditioning control apparatus is designed to supply, for example, a building management set temperature $T_{BIL}$ as an air-conditioning set value from an integrated management central system to a DDC (direct digital controller) as an air-conditioning controller, and control an air-conditioning unit to make an indoor temperature (air-conditioning control target) Ta coincide with the building management set temperature $T_{BIL}$.

In addition, as an air-conditioning environment measurement apparatus, an apparatus has been proposed, which is designed to measure, for example, a PMV (Predicted Mean Vote) value as an indoor thermal environment index on the basis of various preset values, e.g., measured temperature and humidity in an indoor environment, the human metabolism value, and a thermal resistance of clothing. With the use of this air-conditioning environment measurement apparatus, a comfortable indoor environment can be obtained by controlling an air-conditioning unit to set a measured PMV value to zero.

In the above-described conventional air-conditioning control apparatus, however, decision of the building management set temperature $T_{BIL}$ in the integrated management central system is dependent on the experience and intuition of a building manager. That is, the building management set temperature $T_{BIL}$ is arbitrarily determined without using any definite criterion. As a result, tenants are dissatisfied.

This dissatisfaction can be eliminated, if the tenants perform fine adjustment of temperature to change the building management set temperature $T_{BIL}$ to the respective tenant set temperatures.

Such a manner of finely adjusting the building management set temperature $T_{BIL}$ to eliminate the dissatisfaction of each tenant is only a temporary method. That is, an environment which satisfies the tenant cannot be set unless fine adjustment of the building management set temperature $T_{BIL}$ is repeated every time the temperature and humidity in the room change.

Furthermore, in the above conventional air-conditioning environment measurement apparatus, since a PMV value is defined as an index of sensation of ordinary man, the personal preference and inclination of a tenant may not be reflected in air-conditioning. That is, even if a certain tenant is exceedingly sensitive to warmness or coldness as compared with ordinary man, his/her sensation of temperature is not reflected in air-conditioning, resulting in dissatisfaction.

SUMMARY OF THE INVENTION

It is an object of the present invention to provide a building management set value decision support apparatus which can provide a criterion for determining a building management value as an objective, plausible value, and a proper building management set value, and also allow an easy operation to provide these values.

It is another object of the present invention to provide a set offset value learning apparatus, a set offset value learning/set bias value determining apparatus, a neural network operation apparatus and an air-conditioning environment measurement apparatus which can reflect the personal preference or inclination of each tenant in air-conditioning control.

In order to achieve the above object, according to the present invention, there is provided a building management set value decision support apparatus embodying thermal environment index calculation/display means for calculating/displaying a current value of a thermal environment index on the basis of a measured value of an air-conditioning control target and measured or preset values of other predetermined parameters, and pseudo-thermal environment index calculation/display means for calculating/displaying a pseudo-thermal environment index on the basis of a supplied building management set value and the measured or preset values of the other predetermined parameters.

According to the present invention, the current value of a thermal environment index is calculated/displayed on the basis of the measured value of an air-conditioning control target and the measured or preset values of other predetermined parameters. When a building management set value is supplied to the apparatus, a thermal environment index is calculated/displayed as a pseudo-value on the basis of the supplied building management set value and the measured and preset values of other predetermined parameters. With this operation, if the current value of the thermal environment index falls outside a predetermined range, the support can be provided by the apparatus in changing/correcting the building management set value. That is, the apparatus calculates/displays the pseudo-value of the thermal environment index upon receiving a building management set value so that a building management set value may be determined to make the pseudo-value of the thermal environment index fall within the predetermined range.

BRIEF DESCRIPTION OF THE DRAWINGS

FIGS. 5(a), 5(b), 5(c) and 5(d) are graphs showing membership functions of Ta, RH, Met, and Icl which are stored in an intermediate layer unit when the unit is generated;

FIGS. 9(a), 9(b), 9(c) and 9(d) are graphs showing membership functions of Ta, RH, Met, and Icl as input data to an intermediate layer unit;

FIGS. 10(a), 10(b), 10(c) and 10(d) are graphs showing a state wherein a fuzzy operation is performed between each input data and corresponding stored data in an intermediate layer unit;

FIGS. 15(a), 15(b), 15(c), 15(d) and 15(e) are graphs showing membership functions of Ta, RH, Met, and Icl which are stored in an intermediate layer unit when the unit is generated;

FIG. 20 is a block diagram for explaining the learning/determining operation of the set determining section (second embodiment) which is performed when the indoor temperature Ta and the indoor humidity RH are to be simultaneously controlled;

FIGS. 25(a), 25(b), 25(c) and 25(d) are graphs showing a state wherein a fuzzy operation is performed between each input data and corresponding stored data in an intermediate layer unit;

FIGS. 29(a), 29(b), 29(c) and 29(d) are timing charts for explaining the operation of the air-conditioning controller shown in FIG. 6; and FIGS. 30(a), 30(b), 30(c), 30(d), 30(e), 30(f), 30(g) and 30(h) are timing charts for explaining the air-conditioning environment measurement apparatuses shown in FIGS. 23 and 28.

DETAILED DESCRIPTION OF THE PREFERRED EMBODIMENTS

A building management set value decision support apparatus, a set offset value learning apparatus, and a set offset value learning/set bias value determining apparatus according to the present invention will be described first with reference to FIGS. 1 to 22 and 29(a) to 29(d).

Figure 6:
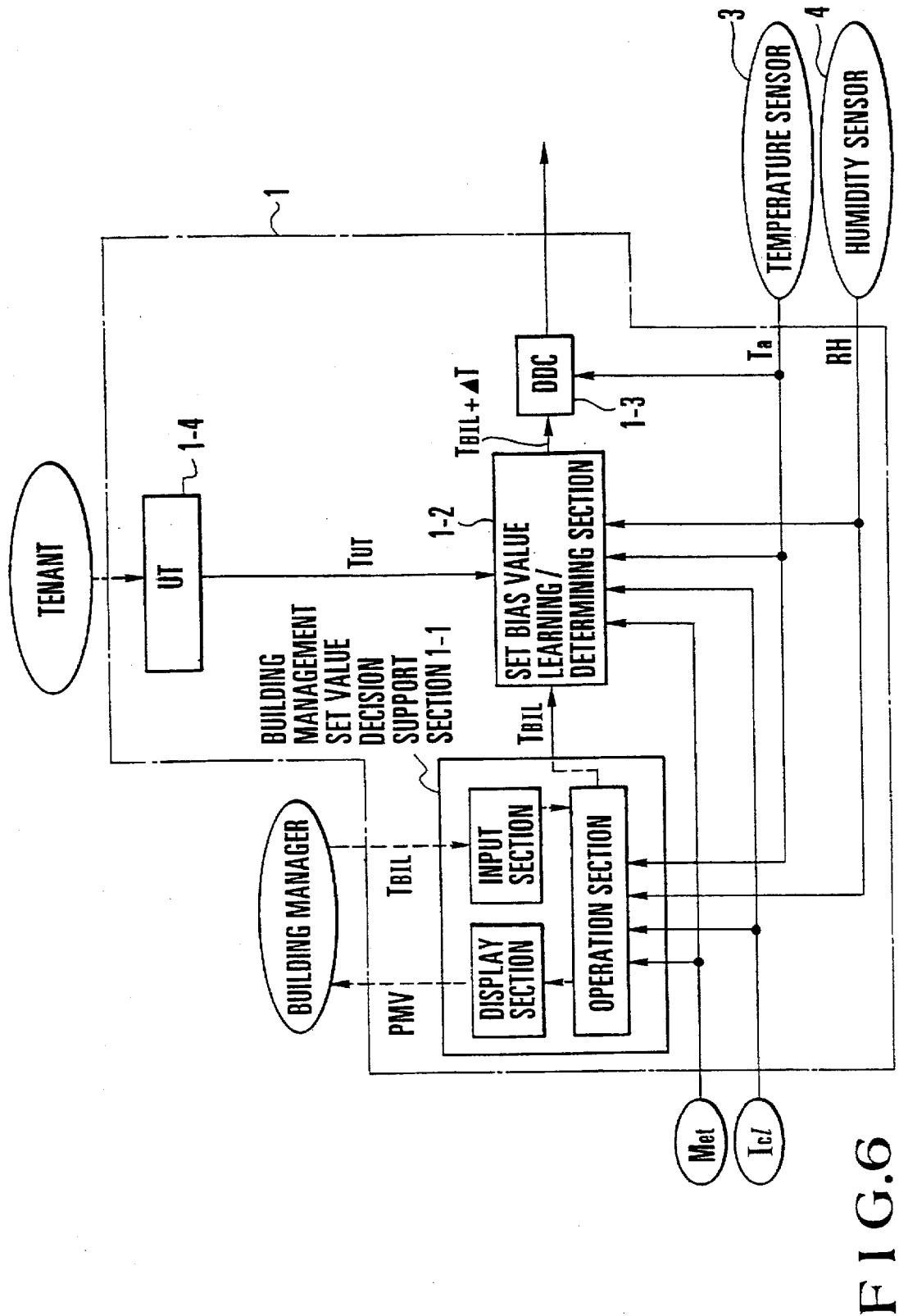
FIG. 6 is a block diagram showing an air-conditioning controller.

FIG. 6 shows an air-conditioning control apparatus. Referring to FIG. 6, reference numeral 1-1 denotes a building management set value decision support section according to the first aspect of the present invention; 1-2, a set offset value learning/set bias value determining section according to the second to ninth aspects of the present invention; 1-3 a DDC (Direct Digital Controller); and 1-4, a user terminal (to be referred to as a UT hereinafter) for setting a temperature. An air-conditioning control apparatus 1 is constituted by these components.

A measured indoor temperature Ta on the tenant side, a measured indoor humidity RH on the tenant side, a preset human metabolism value Met, and a preset thermal resistance of clothing Icl are supplied to the building management set value decision support section 1-1 and the set offset value learning/set bias value determining section 1-2 in advance.

The operation of the air-conditioning control apparatus 1 will be described next together with the function of each component.

[First Aspect]

The operation of the building management set value decision support section 1-1 will be described first together with its function.

The building management set value decision support section 1-1 receives a building management set temperature $T_{BIL}$ set by a building manager in an integrated management central system, and replaces the measured indoor temperature Ta with the building management set temperature $T_{BIL}$. The section 1-1 then performs a pseudo-calculation to obtain a PMV (Predicted Mean Vote) value as a thermal environment index on the basis of the measured indoor temperature Ta, i.e., the building management set temperature $T_{BIL}$, the measured indoor humidity RH, the preset metabolism value Met, and the preset thermal resistance of clothing Icl, and displays the calculated PMV value on a monitor screen.

With this operation, the building management set temperature $T_{BIL}$ can be plausibly and scientifically determined as a substantially optimal value by referring to the displayed PMV value and changing the building management set temperature $T_{BIL}$ such that the PMV value becomes a proper value (e.g., within the range of ±1).

That is, with the support of the building management set value decision support section 1-1, the building manager can perform a simulation to check whether the building management set temperature $T_{BIL}$ can make the indoor space of each tenant comfortable, before the building management set temperature $T_{BIL}$ is actually set in the set offset value learning/set bias value determining section 1-2.

The building management set value decision support section 1-1 normally calculates/displays a PMV value as a thermal environment index on the monitor screen on the basis of the measured indoor temperature Ta, the measured indoor humidity RH, the preset metabolism value Met, and the preset thermal resistance of clothing Icl. If the PMV value on the monitor screen deviates from a predetermined range (e.g., the range of ±1), the building manager can receive support from the building management set value decision support section 1-1 in changing/inputting the building management set temperature $T_{BIL}$. That is, since a PMV value as a pseudo-value is calculated/displayed when the building management set temperature is supplied to the building management set value decision support section 1-1, the building management may decide the building management set temperature $T_{BIL}$ such that this pseudo-PMV value falls within the predetermined range.

The building management set value decision support section 1-1 normally displays the degree of comfort (PMV) of an air-conditioning control target. When the building manager determines that the PMV value needs to be changed/modified, the section 1-1 serves as a tool for performing pseudo-calculation of a PMV value and allowing the manager to determine the building management set temperature $T_{BIL}$ upon display and confirmation, unlike the conventional method art in which the building management set temperature $T_{BIL}$ is determined on the basis of the experience and intuition of the manager.

With this operation, the possibility of dissatisfaction on the tenant side can be greatly reduced as compared with the conventional method in which the building management set temperature $T_{BIL}$ is determined without any definite criterion.

In this embodiment, a pseudo-PMV value is calculated/displayed as a thermal environment index. However, ET* (New Effective Temperature) may be calculated/displayed as a pseudo-value. In addition, in the embodiment, a PMV value calculated as a pseudo-value is displayed on the monitor screen. However, this value may be printed at a printer.

[Second to Seventh Aspects]

The function and operation of the first embodiment of the set offset value learning/set bias value determining section 1-2 will be described next.

Figure 1:
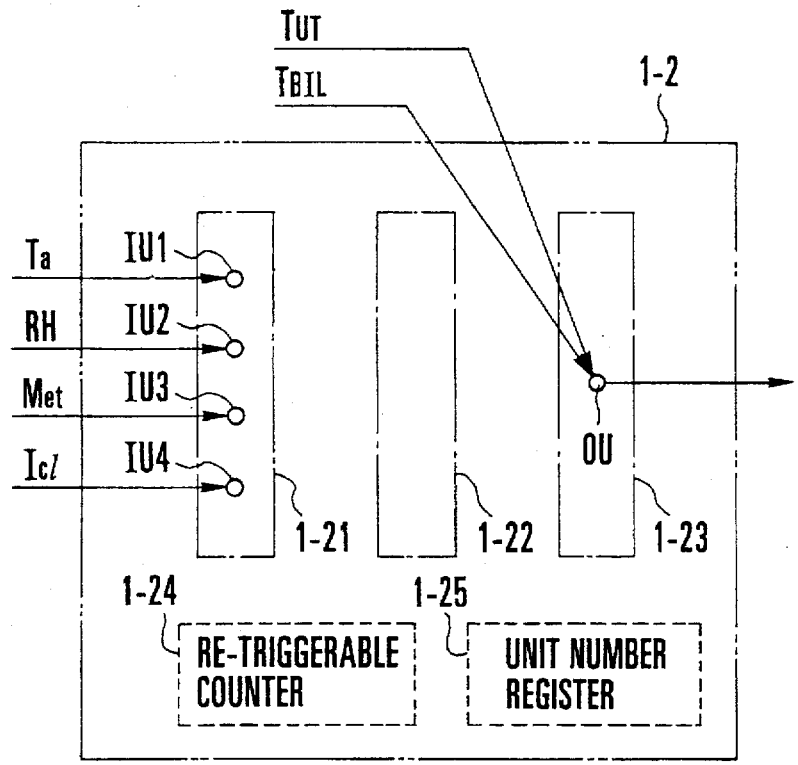
FIG. 1 is a block diagram showing the initial state (before a learning operation) of a set\offset value learning\set bias determining section (first embodiment) applied to a building management set value decision support apparatus, a set\offset value learning apparatus, and a set offset value learning/set bias value determining apparatus according to the present invention (first to ninth aspects)
Figure 2:
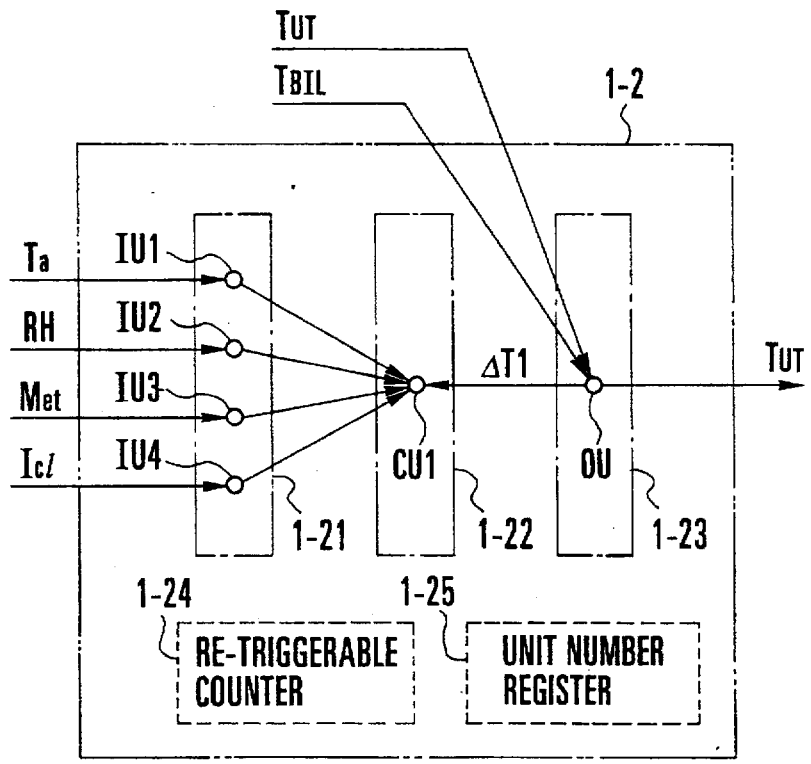
FIG. 2 is a block diagram showing a state wherein one intermediate layer unit is generated in the set determining section (first embodiment)

The set offset value learning/set bias value determining section 1-2 has an input layer 1-21, an intermediate layer 1-22, an output layer 1-23, a re-triggerable counter 1-24, and a unit number register 1-25, as shown in FIG. 1 which shows the main part of the section 1-2.

The input layer 1-21 has input layer units IU1 to IU4, each of which receives the measured indoor temperature Ta, the measured indoor humidity RH, the preset metabolism value Met, and the preset thermal resistance of clothing Icl. FIG. 1 shows the initial state (the state before a learning operation) of the set determining section 1-2. In this state, an intermediate layer unit CU (to be described later) has not been formed yet in the intermediate layer 1-22. The output layer 1-23 has a single output layer unit OU.

[Learning Operation: Second Aspect] Referring to FIG. 6, when the UT 1-4 is operated to set a tenant set temperature $T_{UT}$ in accordance with the personal preference of a tenant (time $t_{U1}$ in FIG. 29(b)), the tenant set temperature $T_{UT}$ is supplied to the set determining section 1-2. Upon reception of the tenant set temperature $T_{UT}$, the set determining section 1-2 supplies the input tenant set temperature $T_{UT}$, as a set value (air-conditioning value), to the DDC 1-3 (time $t_{u1}$ in FIG. 29(d)) (see FIG. 2 and step 401 in FIG. 4).

Furthermore, in response to a command of changing the tenant set temperature $T_{UT}$, the set determining section 1-2 generates an intermediate layer unit $CU_1$, and determines an intrinsic number (unit number) indicating the ordinal number of the intermediate layer unit $CU_1$ in a sequence of generation. The set bias value learning/determining section 1-2 then supplies this unit number to the intermediate layer unit $CU_1$ to cause the unit to store it (step 402). In this case, the unit number is stored, as "1", in the intermediate layer unit $CU_1$. The output layer unit OU calculates a difference between the tenant set temperature $T_{UT}$ and the building management set temperature $T_{BIL}$, and supplies the difference, as a set offset value $\Delta T1$, to the intermediate layer unit $CU_1$ to cause the unit to store the value (step 404).

The intermediate layer unit $CU_1$ loads the measured indoor humidity RH, the preset metabolism value Met, and the preset thermal resistance of clothing Icl at the time of generation of the unit, and forms and stores triangular membership functions having the loaded values as central values, which are respectively shown in FIGS. 5(b) to 5(d) (step 403). In addition, the intermediate layer unit $CU_1$ loads the measured indoor temperature Ta at the time of generation of the functions, and forms and stores a trapezoidal membership function like the one shown in FIG. 5(a) on the basis of the loaded value and the tenant set temperature $T_{UT}$ (step 405).

The output layer unit OU sets the unit number, determined in step 402, in the unit number register 1-25 (step 406) and also clears (time $t_{U1}$ in FIG. 29(c)) the count value of the re-triggerable counter 1-24 to restart the counter 1-24 (step 407).

Figure 3:
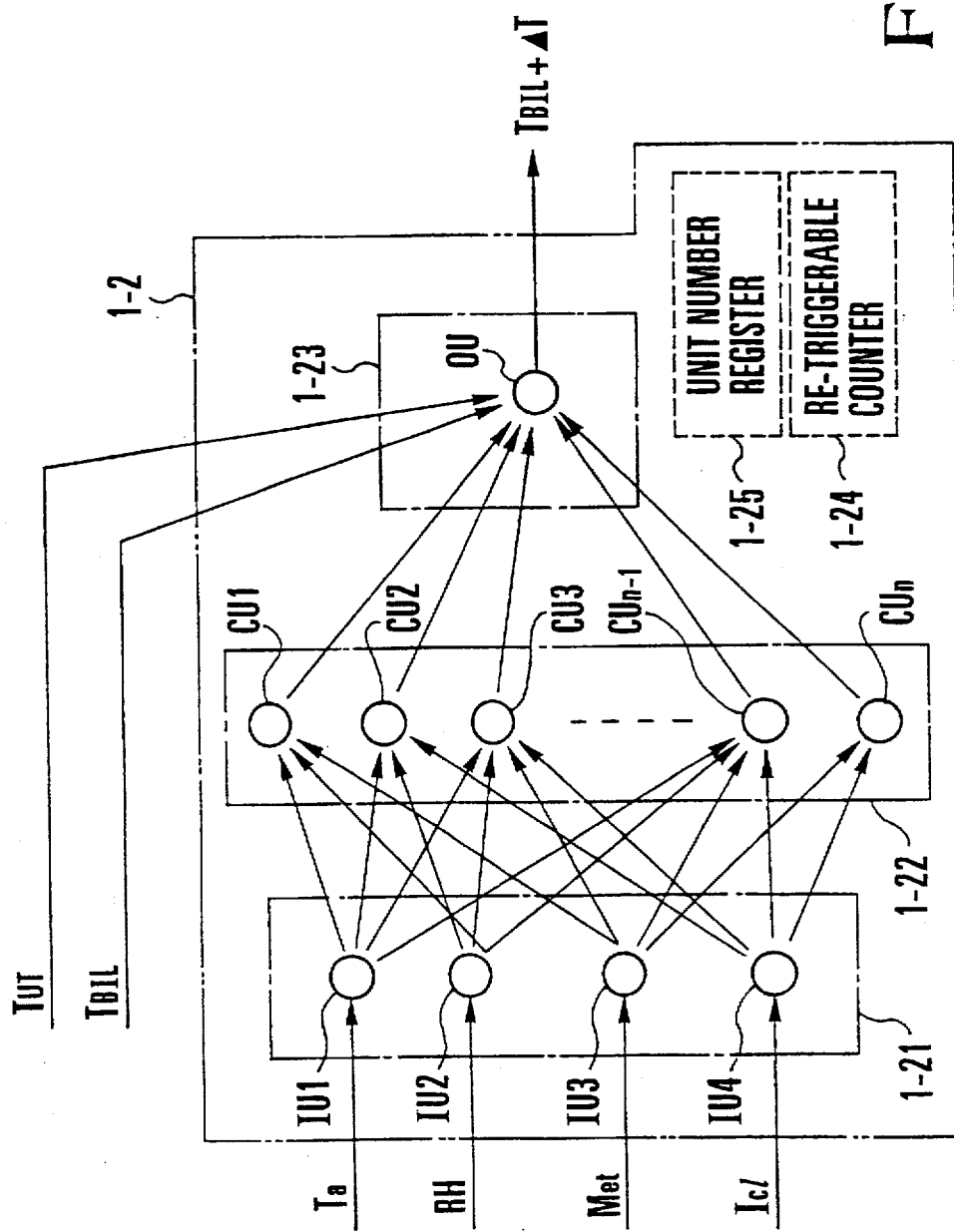
FIG. 3 is a block diagram showing a state wherein n intermediate layer units are generated in the set determining section (first embodiment)
Figure 4:
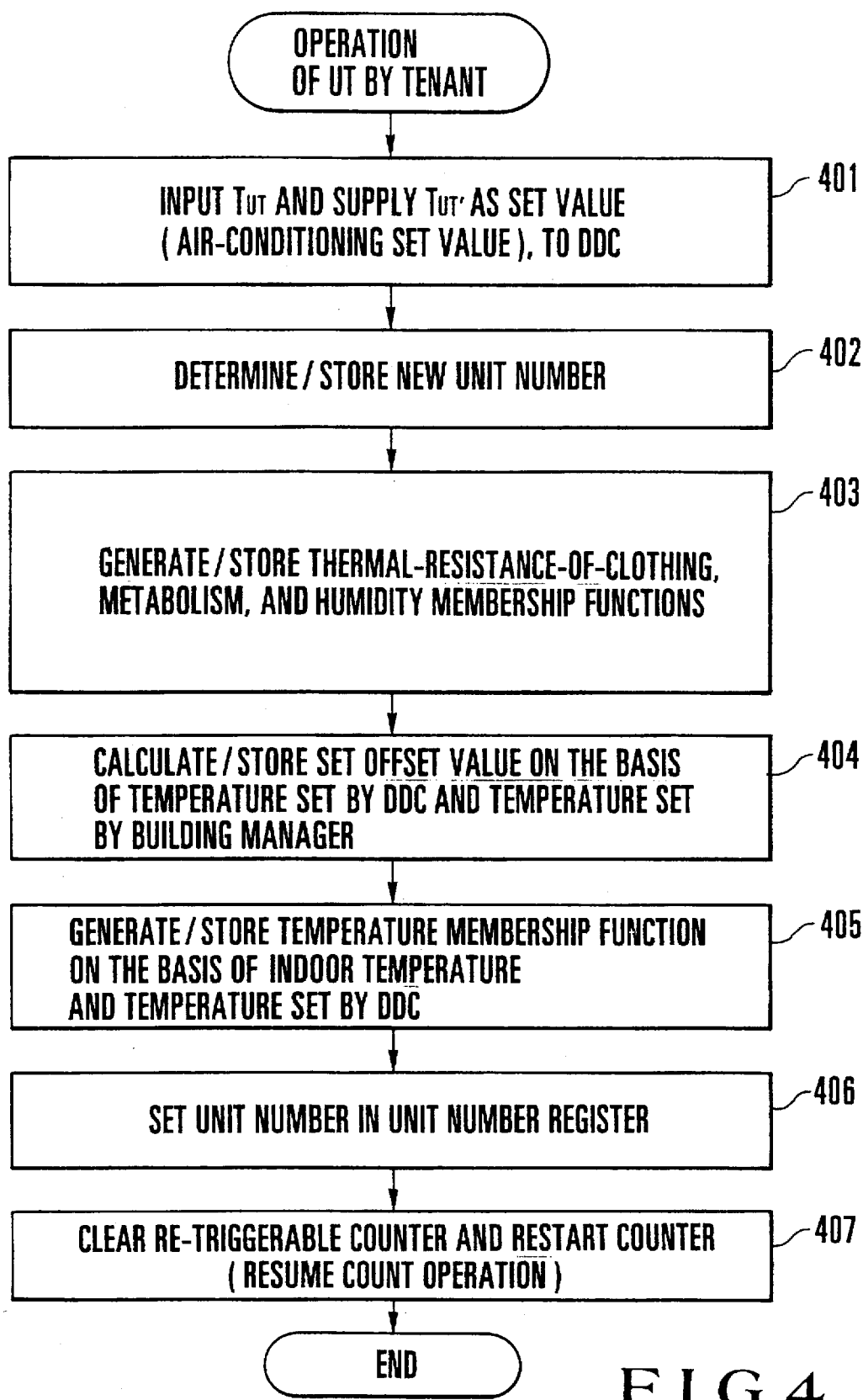
FIG. 4 is a flow chart for explaining the learning operation of the set determining section (first embodiment)

Subsequently, in the same manner as described above, the set determining section 1-2 generates an intermediate layer unit CU every time a command of changing the input tenant set temperature $T_{UT}$ is issued (times $t_{U2}$ and $t_{U3}$ in FIG. 29(b)), and sequentially stores the corresponding unit number, the set offset value $\Delta T1$, and the corresponding membership functions (see FIG. 3). In this manner, a learning operation is performed by the set determining section 1-2 every time the tenant set temperature $T_{UT}$ is changed.

[Fifth, Sixth, and Seventh Aspects]

Assume that in this embodiment the number of generated intermediate layer units CU has reached the maximum number of units which can be generated. In this case, in generating the subsequent intermediate layer unit CU, an intermediate layer unit in which the smallest unit number is stored at this time is reused as the corresponding unit. More specifically, referring to FIG. 3, if an intermediate layer unit $CU_n$ is the upper limit (the last allowable unit to be generated) of the physical storage capacity, the intermediate layer unit $CU_l$ is reused as the (n+1)th intermediate layer unit CU in generating the subsequent intermediate layer unit CU. That is, the intermediate layer unit $CU_l$ is set as an intermediate layer unit $CU_{n30\ l}$, and the corresponding unit number, a set offset value $\Delta Tx$, and the corresponding membership functions are newly stored in the intermediate layer unit $CU_{n-l}$. With this operation, even if the number of intermediate layer units CU to be generated is limited, a learning operation can be repeatedly performed with changes in the tenant set temperature $T_{UT}$. Furthermore, even if the number of intermediate layer units CU to be generated is limited, since the unit number increases in the order of generation, the last-in priority function keeps properly working in a determining operation (to be described next).

[Determining Operation 1: Third Aspect]

When the re-triggerable counter 1-24 is incremented, a determining operation is performed. This determining operation will be described below with reference to the flow chart shown in FIG. 7. Referring to FIG. 3, assume that after the re-triggerable counter 1-24 is restarted in response to a command of changing the air-conditioning set value to the tenant set temperature $T_{UT}$, the re-triggerable counter 1-24 is incremented (time $t_{R1}$ in FIG. 29(c); Step 701), i.e., the re-triggerable counter 1-24, which has been restarted in step 407, is incremented in step 701. In response to this operation, in the intermediate layer 1-22, each intermediate layer unit CU calculates its own activation amount (step 702).

Each intermediate layer unit CU calculates its own activation amount in the following manner. The measured indoor temperature Ta, the measured indoor humidity RH, the preset metabolism value Met, and the preset thermal resistance of clothing Icl are supplied to each intermediate layer unit CU through the input layer units IU1 to IU4 in advance. In this case, the input layer units IU1 to IU4 convert the respective values Ta, RH, Met, and Icl into fuzzy data, i.e., triangular membership functions (see FIGS. 9(a) to 9(d)), and supply them to each intermediate layer unit CU. Each intermediate layer unit CU performs a fuzzy operation indicated by equation (1) between each of the membership functions supplied from the input layer units IU1 to IU4 and a corresponding one of the stored membership functions for each axis. That is, each intermediate layer unit CU performs a fuzzy operation between input data and stored data for each of the following axes: a temperature axis, a humidity axis, a metabolism value axis, and a thermal-resistance-of-clothing axis.

$$\mu im = max \{(\mu si) min(\mu uim)\} \quad (1)$$

where μm is the activation amount of an axis i of an intermediate layer unit $CU_m$, μsi is the membership function of input data of the axis i, μuim is the stored membership function of the axis i of the intermediate layer unit $CU_m$, max is a maximizing operation, and min is a minimizing operation.

FIGS. 10(a) to 10(d) show how fuzzy operations are performed on the temperature, humidity, metabolism value, and thermal-resistance-of-clothing axes, respectively. Referring to FIGS. 10(a) to 10(d), reference symbols μTai, μRHi, μMeti, and μIcli denote the activation amounts obtained for the respective axes.

The activation amount of each intermediate layer unit CU is finally obtained from the activation amount obtained for each axis according to equation (2):

$$\mu m = \mu 1m \times \mu 2m \times \mu 3m \times \mu 4m \quad (2)$$

where μ1m is μTam, μ2m is μRHm, μ3m is μMetm, and μ4m is μIclm.

Upon calculating its own activation amount in this manner, each intermediate layer unit CU, which has obtained the activation amount as a finite value, i.e., has been ignited, supplies the calculated activation amount, the stored unit number, and the set offset value, ΔTx, as an information pack, to the output layer unit OU (step 703).

The output layer unit OU selects one or a plurality of intermediate layer units CU having the maximum activation amount on the basis of the information packs supplied from the respective intermediate layer units CU (step 704). The output layer unit OU then checks whether a plurality of intermediate layer units CU having the maximum activation amount are present (step 705). If only one unit having the maximum activation amount is present, the flow advances to step 707 to set the unit number of the intermediate layer unit CU in the unit number register 1-25. Otherwise, the output layer unit OU selects one of the intermediate layer units CU which has the largest unit number (step 706), i.e., gives a priority to the last unit, and sets the unit number of the selected unit in the unit number register 1-25 (step 707). The output layer unit OU then clears and restarts the re-triggerable counter 1-24 (step 708). The unit OU outputs the set offset value ΔTx, stored in the intermediate layer unit CU having the above unit number set therein, to the unit number register 1-25 (step 709). The unit OU adds this set offset value ΔTx as a set bias value $^\Delta T$ to the building management set temperature $T_{BIL}$ (step 710), and outputs the sum, as a new air-conditioning value, to the DDC 1-3 (time $t_{R1}$ in FIG. 29(d); step 711).

With this operation, the optimal tenant set temperature $T_{UT}$ is selected from the temperatures set by the tenant in the past in accordance with the values Ta, RH, Met, and Icl in a determining operation, and air-conditioning control is performed by using the selected tenant set temperature $T_{UT}$ as an air-conditioning set value. That is, air-conditioning control corresponding to the personal preference of the tenant is automatically reproduced in accordance with an indoor environment in the determining operation.

The determining operation of the set determining section 1-2 is performed not only when the re-triggerable counter 1-24 is incremented after an air-conditioning set value is changed to the tenant set temperature $T_{UT}$ but also whenever the re-triggerable counter 1-24 is incremented while the tenant set temperature $T_{UT}$ is updated (times $T_{R2}$, $T_{R3}$, and $T_{R5}$ in FIG. 29(c)). Once a determining operation is performed, the air-conditioning set value set in this determining operation is maintained until the next determining operation is performed. In this embodiment, the re-triggerable counter 1-24 is incremented at 30-min intervals. Without the re-triggerable counter 1-24, the air-conditioning set value is frequently changed, and hunting may occur in the worst case. That is, since the response, i.e., the time constant, of an air-conditioning set value changes at short time intervals, air-conditioning control is confused.

As described above, according to the air-conditioning control apparatus of this embodiment, the difference between the tenant set temperature $T_{UT}$ and the building management set temperature $T_{BIL}$ is learnt as the set offset value ΔTx, and the set bias value $^\Delta T$ is determined by a periodical determining operation, thereby reproducing air-conditioning control in accordance with the personal preference of each tenant. Therefore, dissatisfaction of each tenant with respect to air-conditioning can be alleviated.

In addition, according to this embodiment, since a learning operation is performed by generating intermediate layer units CU, a high-speed learning operation with respect to a neural network of a back propagation, hop field, or Bolzmann scheme can be realized. In addition, the tenant need not repeatedly perform an operation for learning processing, thereby realizing a user-friendly apparatus.

The intermediate layer unit CU having the maximum activation amount is selected in a determining operation with a priority given to the last unit, and the set bias value is extracted therefrom. With this operation, a set value can be properly changed, and a correcting operation for a setting operation error can be properly performed.

In addition, since no limitations are imposed on physical storage capacity owing to the allocation of unit numbers to intermediate layer units and the last-in priority function, the set determining section 1-2 can be reduced in size. That is, when the set determining section 1-2 is to be incorporated in the UT 1-4, a reduction in the size of the UT 1-4 can be realized.

Moreover, according to the embodiment, since fuzzy operations are performed in the neural network of the set determining section 1-2, ample margins can be given to the output precision of a temperature sensor 3 and a humidity sensor 4. As a result, an inexpensive sensor which does not have very high measurement precision can be used, and the set position of the sensor need not coincide with a typical point of a room. That is, since input data to the set determining section 1-2 are treated as fuzzy values, the condition that input data must be accurate can be alleviated. As a result, determination performed by the set determining section 1-2 imitates determination performed by the human body with respect to a thermal environment.

[Determining Operation 2: Fourth Aspect]

Figure 7:
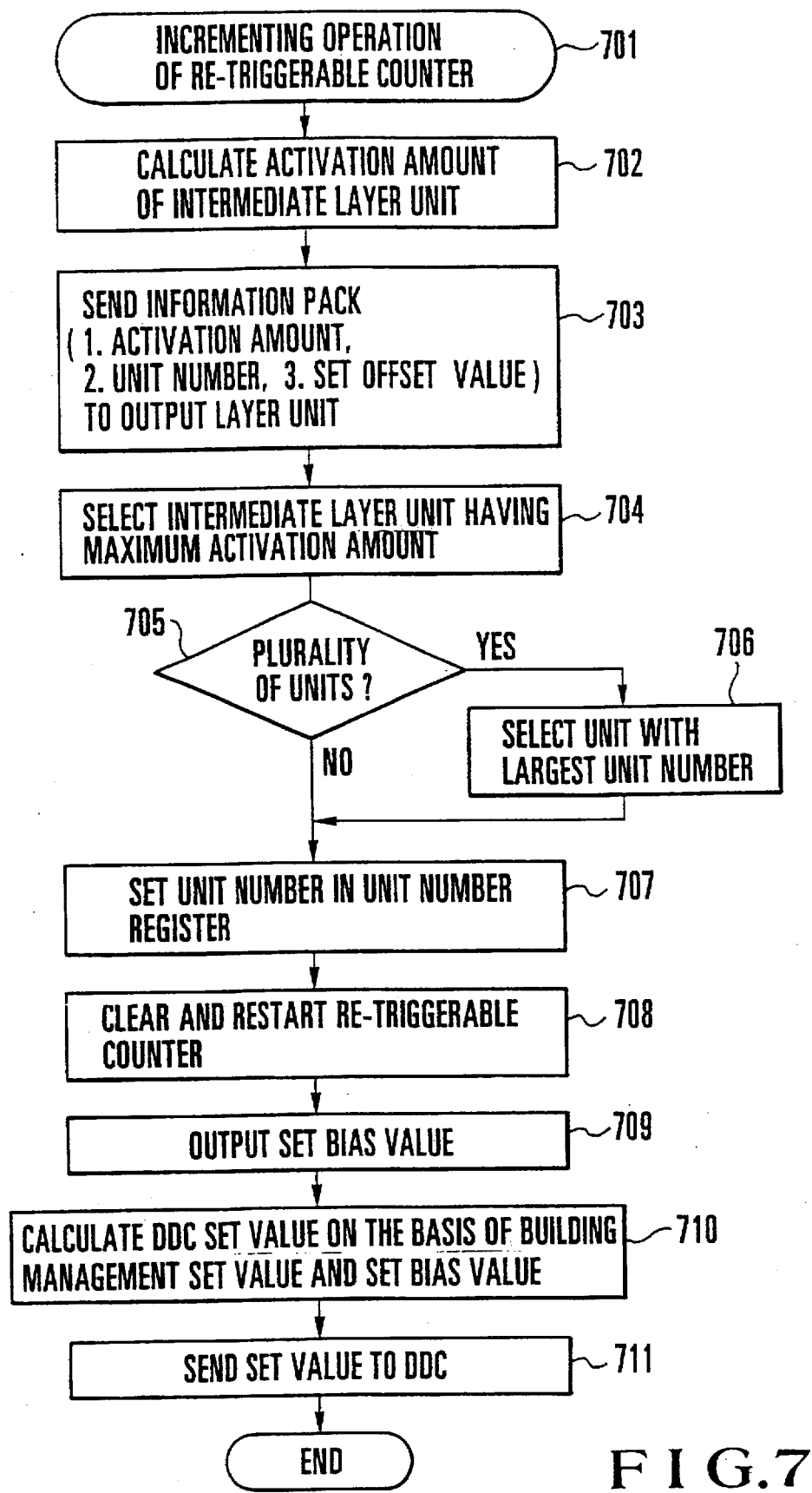
FIG. 7 is a flow chart for explaining a determining operation 1̂ in the set determining section (first embodiment)
Figure 8:
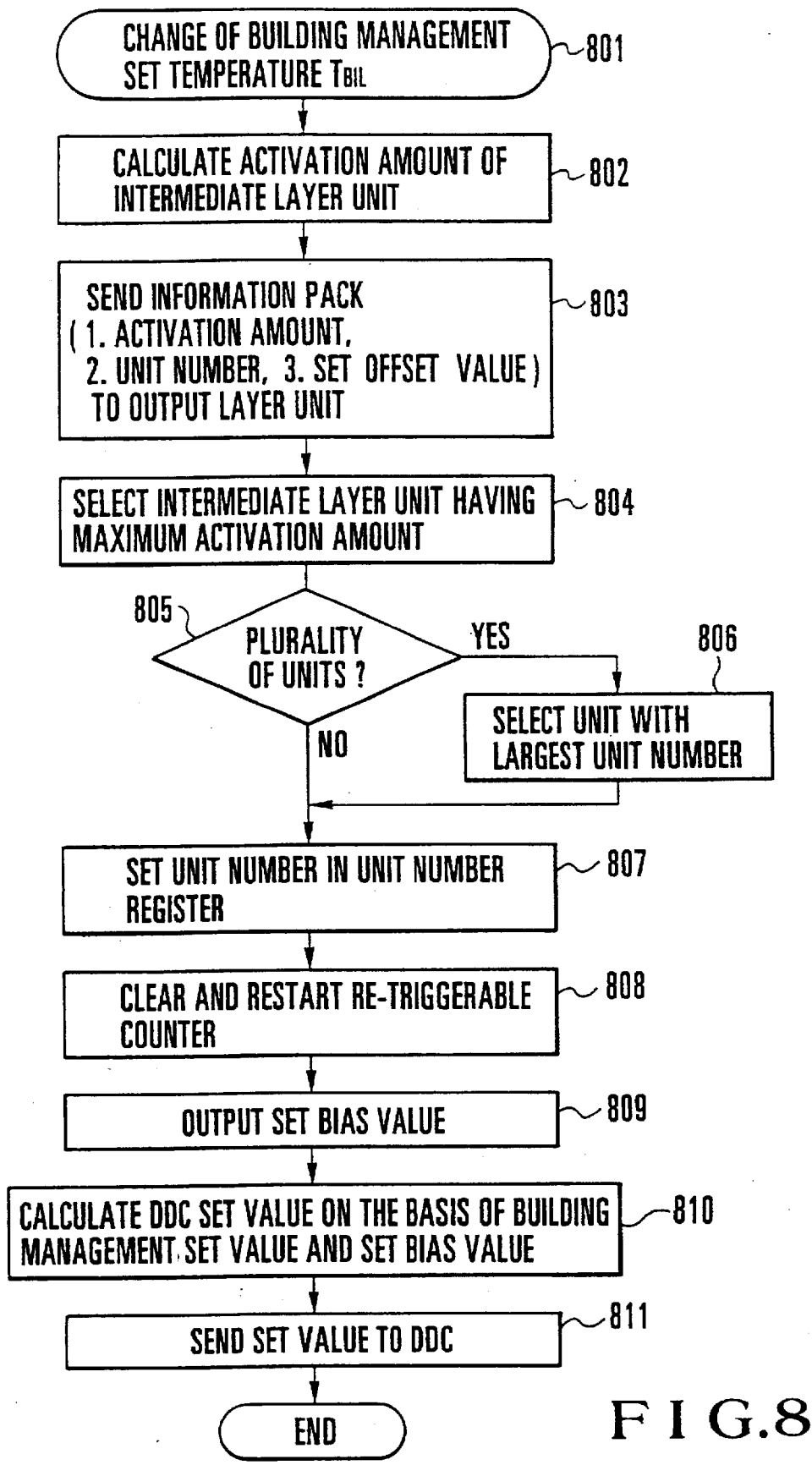
FIG. 8 is a flow chart for explaining a determining operation 2̂ in the set determining section (first embodiment)

In this embodiment, when the building management set temperature $T_{BIL}$ is changed (time $t_{B1}$ in FIG. 29(a); step 801 in FIG. 8), the set determining section 1-2 performs a determining operation in the same manner as in the case wherein the re-triggerable counter 1-24 is incremented (step 701 in FIG. 7). The set bias value $^{▲}T$ obtained by this determining operation is added to the building management set temperature $T_{BIL}$ after it is changed, and the sum is supplied, as a new air-conditioning set value, to the DDC 1-3 (time $t_{B1}$ in FIG. 29(d)).

Figure 11:
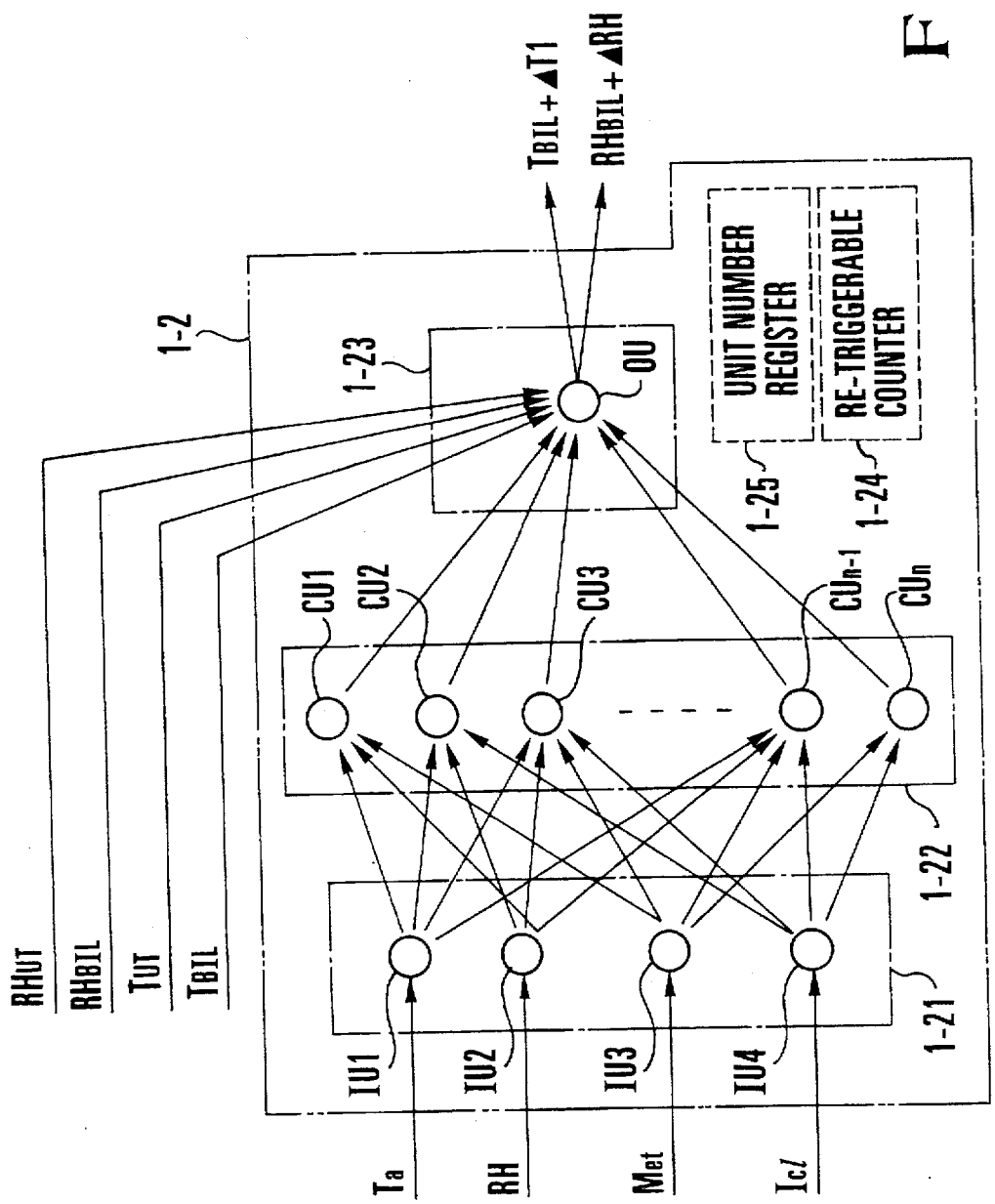
FIG. 11 is a block diagram for explaining the learning/determining operation of the set determining section (first embodiment) which is performed when the indoor temperature Ta and the indoor humidity RH are to be simultaneously controlled.

In this embodiment, only the measured indoor temperature Ta is controlled. However, the present invention can be applied to a case wherein both the measured indoor temperature Ta and the measured indoor humidity RH are treated as air-conditioning control targets, and the two targets are simultaneously controlled. In this case, the building management set temperature $T_{BIL}$ and a building management set humidity $RH_{BIL}$ are determined with the support of the building management set value decision support section 1-1, and the determined values are supplied to the set determining section 1-2, as shown in FIG. 11. The set determining section 1-2 performs a learning operation in response to a command of changing the tenant set temperature $T_{UT}$ or a tenant set humidity $RH_{UT}$. The section 1-2 then stores temperature and humidity set offset values $\Delta Tx$, a unit number, and membership functions in the generated intermediate layer unit CU. In this case, the humidity membership function stored in the intermediate layer unit CU has a trapezoidal shape, similar to the temperature membership function. In a determining operation, the temperature and humidity set offset values $\Delta Tx$, unit number, and activation amount of each ignited intermediate layer unit CU are supplied, as an information pack, to the output layer unit OU. The output layer unit OU then adds the set offset values $\Delta Tx$ and $\Delta RHx$, extracted from the information packs, as set bias values $^{▲}T$ and $^{▲}RH$, to the building management set temperature $T_{BIL}$ and the building management set humidity $RH_{BIL}$, and supplies the sums, as air-conditioning set values, to the DDC 1-3.

Furthermore, in the embodiment, the measured indoor temperature Ta, the measured indoor humidity RH, the preset metabolism value Met, and the preset thermal resistance of clothing Icl are supplied to the building management set value decision support section 1-1 and the set determining section 1-2. In this case, parameters other than an air-conditioning control target, i.e., the parameters RH, Met, and Icl other than the parameter Ta, may be supplied as measured values or preset values. In addition to the parameters Ta, RH, Met, and Icl, an air velocity Vair, a radiant temperature Tr, and the like as indoor environment parameters may be supplied as measured or preset values. In this case, it is apparent that a PMV value is calculated by the building management set value decision support section 1-1 on the basis of the parameters Ta, RH, Met, Icl, Vair, and Tr. In addition, as is apparent, in the set determining section 1-2, input layer units for the parameters Vair and Tr are added to the input layer 1-21, and learning and determining are performed by using these parameters as well as the above parameters.

[Eighth and Ninth Aspects]

The function and operation of the second embodiment of a set determining section 1-2 will be described next.

Figure 12:
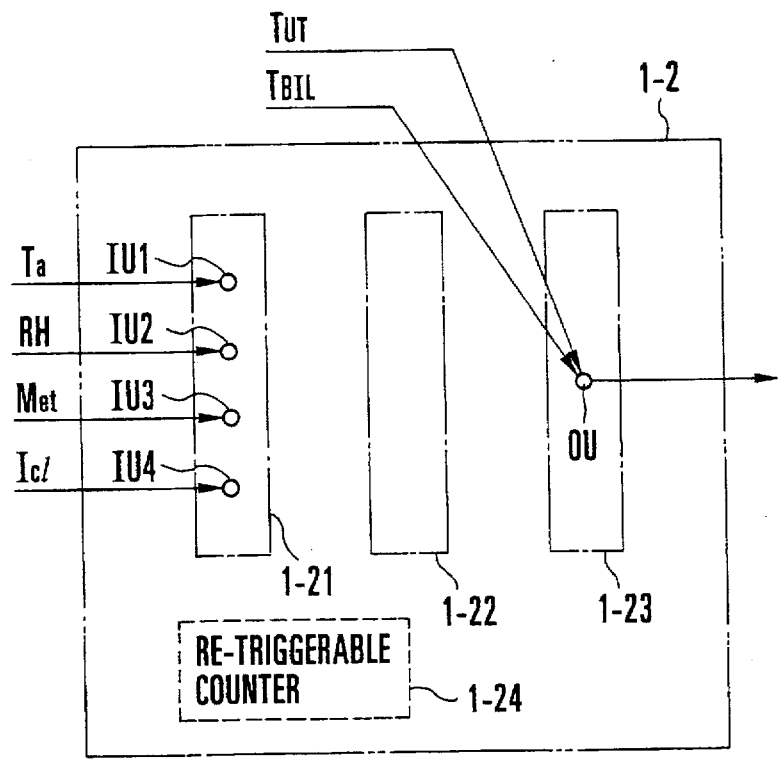
FIG. 12 is a block diagram showing the initial state (before a learning operation) of a set determining section (second embodiment)
Figure 13:
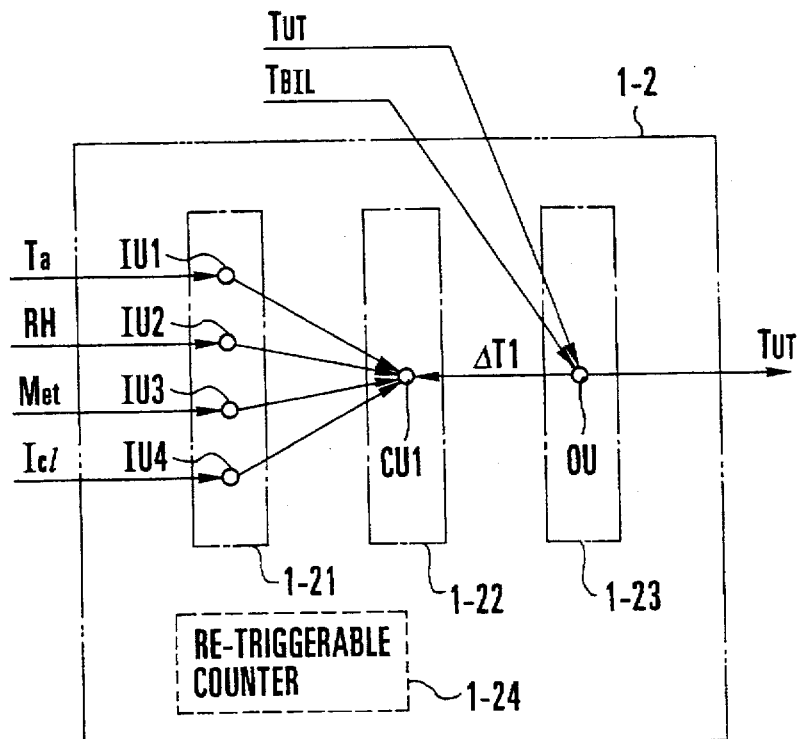
FIG. 13 is a block diagram showing a state wherein one intermediate layer unit is generated in the set determining section (second embodiment)
Figure 14:
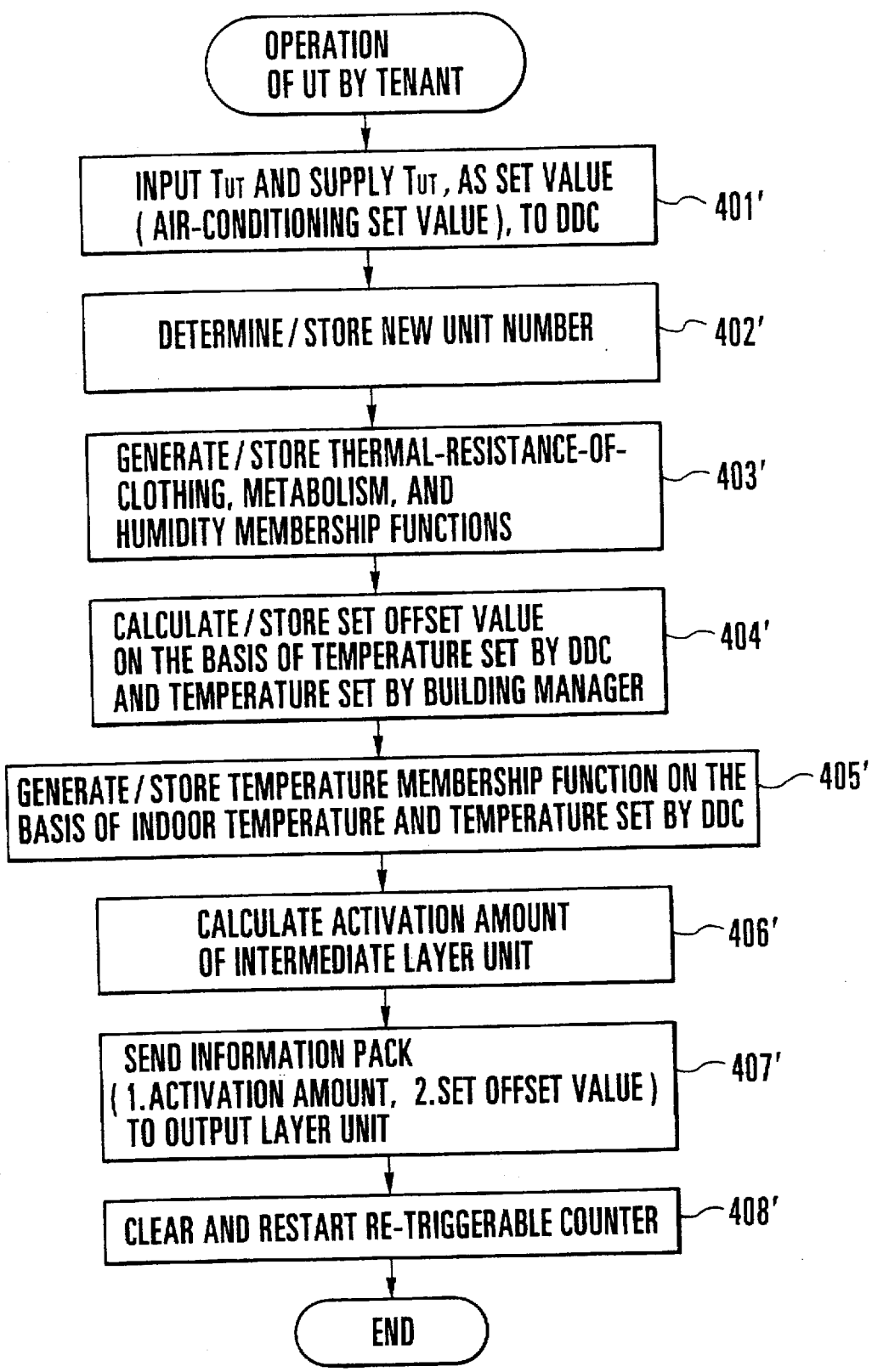
FIG. 14 is a flow chart for explaining a learning operation in the set determining section (second embodiment)

The set determining section 1-2 has an input layer 1-21, an intermediate layer 1-22, an output layer 1-23, and a re-triggerable counter 1-24, as shown in FIG. 12, which shows the main part of the section 1-2.

The input layer 1-21 has input layer units IU1 to IU4, to which a measured indoor temperature Ta, a measured indoor humidity RH, a preset metabolism value Met, and a preset thermal resistance of clothing Icl are respectively supplied. FIG. 12 shows the initial state (the state before a learning operation) of the set determining section 1-2. In this state, an intermediate layer unit CU (to be described later) has not been formed yet in the intermediate layer 1-22. The output layer 1-23 has a single output layer unit OU.

[Learning Operation: Eighth Aspect]

Referring to FIG. 6, when the UT 1-4 is operated to set a tenant set temperature $T_{UT}$ in accordance with the personal preference of a tenant (time $t_{U1}$ in FIG. 29(b)), the tenant set temperature $T_{UT}$ is supplied to the set determining section 1-2. Upon reception of the tenant set temperature $T_{UT}$, the set determining section 1-2 supplies the input tenant set temperature $T_{UT}$, as a set value (air-conditioning value), to the DDC 1-3 (time $t_{U1}$ in FIG. 29(d); see FIG. 13 and step 401' in FIG. 14).

Furthermore, in response to a command of changing the tenant set temperature $T_{UT}$, the set determining section 1-2 generates an intermediate layer unit $CU_1$, and determines an intrinsic number (unit number) indicating the ordinal number of the intermediate layer unit $CU_1$ in a sequence of generation. The set bias value learning/determining section 1-2 then supplies this unit number to the intermediate layer unit $CU_1$ to cause the unit to store it (step 402'). In this case, the unit number is stored, as "1", in the intermediate layer unit $CU_1$. The output layer unit OU calculates the difference between the tenant set temperature $T_{UT}$ and the building management set temperature $T_{BIL}$, and supplies the difference, as a set offset value $\Delta T1$, to the intermediate layer unit $CU_1$ to cause the unit to store the value (step 404').

The intermediate layer unit $CU_1$ loads the measured indoor humidity RH, the preset metabolism value Met, and the preset thermal resistance of clothing Icl at the time of generation of the functions, and forms and stores trapezoidal membership functions having the loaded values as central values, which are respectively shown in FIGS. 15(b) to 15(d) (step 403'). Note that these membership functions need not be trapezoidal and may be triangular. Trapezoidal membership functions can have more margins.

In addition, the intermediate layer unit $CU_1$ loads the measured indoor temperature Ta at the time of generation of the unit, and forms and stores a trapezoidal membership function like the one shown in FIG. 15(a) on the basis of the loaded value and the tenant set temperature $T_{UT}$ or a trapezoidal membership function like the one shown in FIG. 15(e) on the basis of the loaded value (step 405'). Subsequently, the intermediate layer unit $CU_1$ calculates/ stores its own activation amount in the same manner as in a determination mode (to be described later) (step 406'), and supplies the activation amount and the set offset value ΔTx, as an information pack, to the output layer unit OU (step 407').

Upon reception of this information pack, the output layer unit OU clears the count value of the re-triggerable counter 1-24 (time $t_{U1}$ in FIG. 29(c)) and restarts it (step 408').

Figure 16:
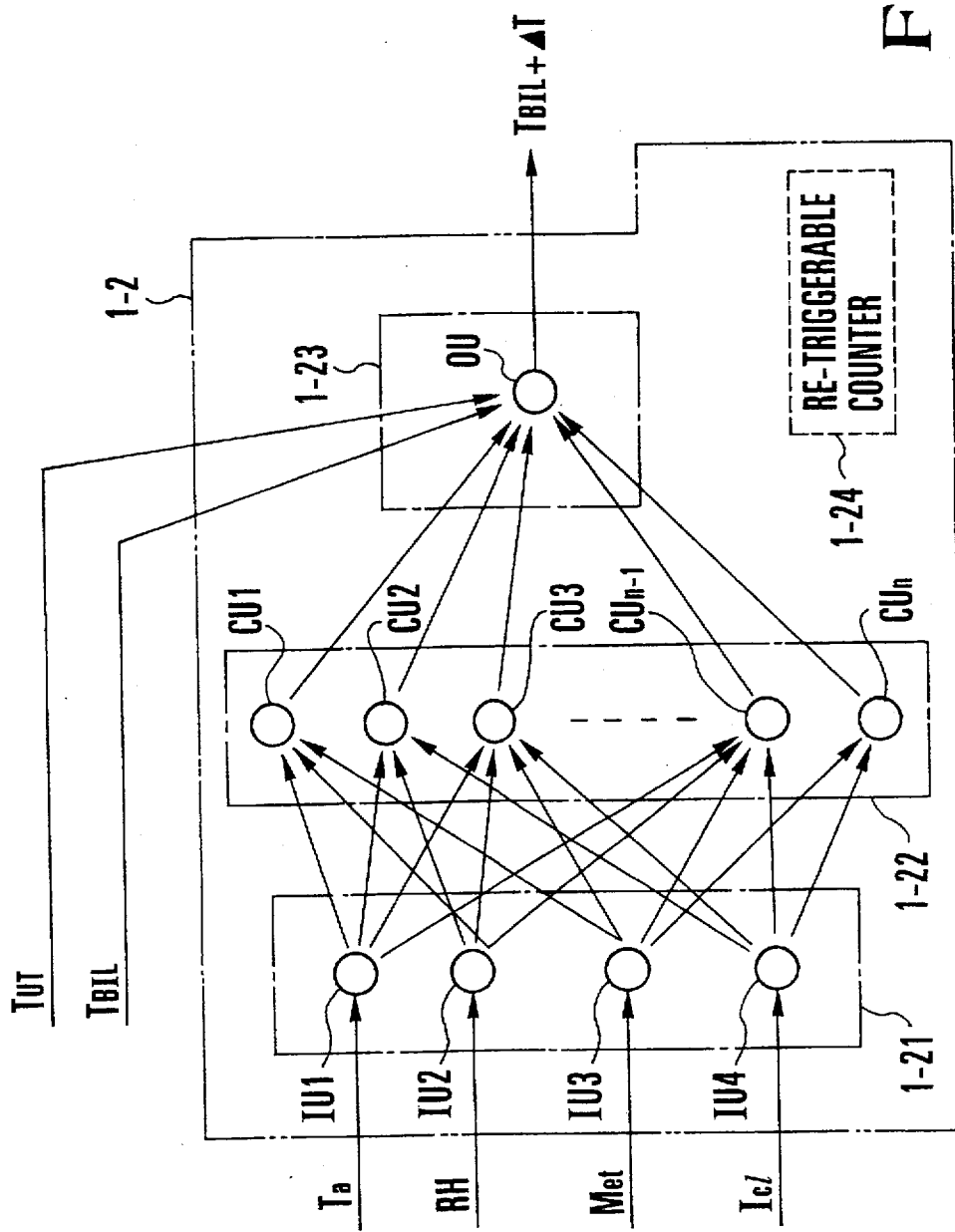
FIG. 16 is a block diagram showing a state wherein n intermediate layer units are generated in the set determining section (second embodiment)

Subsequently, in the same manner as described above, the set determining section 1-2 generates an intermediate layer unit CU every time a command of changing the input tenant set temperature $T_{UT}$ is issued (times $t_{U2}$ and $t_{U3}$ in FIG. 29(b)), and sequentially stores the corresponding unit number, the set offset value ΔTl, the corresponding membership functions, and the activation amount (see FIG. 16). In this manner, a learning operation is performed by the set determining section 1-2 every time the tenant set temperature $T_{UT}$ is changed.

Assume that in this embodiment the number of generated intermediate layer units CU has reached the maximum number of units which can be generated. In this case, in generating the subsequent intermediate layer unit CU, an intermediate layer unit in which the smallest unit number is stored at this time is reused as the corresponding unit. More specifically, referring to FIG. 16, if an intermediate layer unit $CU_n$ is the upper limit (the last allowable unit to be generated) of the physical storage capacity, the intermediate layer unit $CU_1$ is reused as the (n+l)th intermediate layer unit CU in generating the subsequent intermediate layer unit CU. That is, the intermediate layer unit $CU_1$ is set as an intermediate layer unit $CU_{n+l}$, and the corresponding unit number, a set offset value ΔTx, the corresponding membership functions, and the activation amount are newly stored in the intermediate layer unit $CU_{n+l}$. With this operation, even if the number of intermediate layer units CU to be generated is limited, a learning operation can be repeatedly performed with changes in the tenant set temperature $T_{UT}$.

[Determining Operation 1: Eighth Aspect]

When the re-triggerable counter 1-24 is incremented, a determining operation is performed. This determining operation will be described below with reference to the flow chart shown in FIG. 17. Referring to FIG. 16, assume that after the re-triggerable counter 1-24 is restarted in response to a command of changing the air-conditioning set value to the tenant set temperature $T_{UT}$, the re-triggerable counter 1-24 is incremented (time $t_{R1}$ in FIG. 29(c); step 701'), i.e., the re-triggerable counter 1-24, which has been restarted in step 408', is incremented in step 701'. In response to this operation, in the intermediate layer 1-22, each intermediate layer unit CU calculates its own activation amount (step 702').

Each intermediate layer unit CU calculates its own activation amount in the following manner. The measured indoor temperature Ta, the measured indoor humidity RH, the preset metabolism value Met, and the preset thermal resistance of clothing Icl are supplied to each intermediate layer unit CU through the input layer units IU1 to IU4 in advance. In this case, the input layer units IU1 to IU4 convert the respective values Ta, RH, Met, and Icl into fuzzy data, i.e., triangular membership functions (see FIGS. 9(a) to 9(d)), and supply them to each intermediate layer unit CU. Each intermediate layer unit CU performs a fuzzy operation indicated by equation (3) between each of the membership functions supplied from the input layer units IU1 to IU4 and a corresponding one of the stored membership functions for each axis. That is, each intermediate layer unit CU performs a fuzzy operation between input data and stored data for each of the following axes: a temperature axis, a humidity axis, a metabolism value axis, and a thermal-resistance-of-clothing axis.

$$\mu im = max\{(\mu si)min(\mu uim)\} \qquad (3)$$

where μim is the activation amount of an axis i of an intermediate layer unit $CU_m$, μsi is the membership function of input data of the axis i, μuim is the stored membership function of the axis i of the intermediate layer unit $CU_m$, max is a maximizing operation, and min is a minimizing operation.

FIGS. 19(a) or 19(e), 19(b), 19(c) and 19(d) show how fuzzy operations are performed on the temperature, humidity, metabolism value, and thermal-resistance-of-clothing axes, respectively. Referring to FIGS. 19(a) or 19(e), 19(b), 19(c), and 19(d), reference symbols μTai, μRHi, μMeti, and μIcli denote the activation amounts obtained for the respective axes.

The activation amount of each intermediate layer unit CU is finally obtained from the activation amount obtained for each axis according to equation (4):

$$\mu m = \mu 1m \times \mu 2m \times \mu 3m \times \mu 4m \qquad (4)$$

where u1m, is μTam, μ2m is μRHm, μ3m is μMetm, and μ4m is μIclm.

Upon calculating its own activation amount in this manner, each intermediate layer unit CU, which has obtained the activation amount as a finite value, i.e., has been ignited, supplies the calculated activation amount and the set offset value ΔTx, as an information pack, to the output layer unit OU (step 703').

The output layer unit OU executes fuzzy inference by using the activation amount and sets bias value of the information pack supplied from each ignited intermediate layer unit CU, thus obtaining a final set bias value ▲T. More specifically, the output layer unit OU divides the sum total of the products of the activation amounts and set offset value ΔTx of the respective information packs by the sum total of the activation amounts of the respective information packs (equation (5)). With this operation, the final set bias value ▲T is obtained (step 704').

The re-triggerable counter 1-24 is then cleared and restarted (step 705'), and the calculated set bias value ▲T is added to the building management set temperature $T_{BIL}$. The output layer unit OU supplies the sum, as a new air-conditioning value, to the DDC 1-3 (time $t_{R1}$ in FIG. 29(d); step 707').

$$\blacktriangle T = \frac{\text{total sum of activation amounts} \times \text{sets offset values}}{\text{total sum of activation amounts}} = \frac{\sum_m \mu m) \times \blacktriangle Tm)}{\sum_m \mu m} \qquad (5)$$

With this operation, the optimal set offset value ΔTx is obtained by using the values set by the tenant in the past in accordance with the values Ta, RH, Met, and Icl in the determining operation, and air-conditioning control is performed by using a value obtained by adding the set offset value ΔTx to the building management set temperature $T_{BIL}$ as an air-conditioning set value. That is, air-conditioning control corresponding to the personal preference of the tenant is automatically reproduced in accordance with indoor environment parameters in a determining operation.

The determining operation of the set determining section 1-2 is performed not only when the re-triggerable counter 1-24 is incremented after an air-conditioning set value is changed to the tenant set temperature $T_{UT}$, but also whenever the re-triggerable counter 1-24 is incremented while the tenant set temperature $T_{UT}$ is updated (times $t_{R2}$, $t_{R3}$, $tR_4$, and $t_{R5}$ in FIG. 29(c)). Once a determining operation is performed, the air-conditioning set value set in this determining operation is maintained until the next determining operation is performed. In this embodiment, the re-triggerable counter 1-24 is incremented at 30-min intervals. Without the re-triggerable counter 1-24, the air-conditioning set value is frequently changed, and hunting may occur in the worst case. That is, since the response, i.e., the time constant, of an air-conditioning operation in a building is considerably large, if the air-conditioning set value changes at short time intervals, air-conditioning control is confused.

As described above, according to the air-conditioning control apparatus of this embodiment, the difference between the tenant set temperature $T_{UT}$ and the building management set temperature $T_{BIL}$ is learnt as the set offset value $\Delta Tx$, and the set bias value $\blacktriangle T$ is determined by a periodical determining operation, thereby reproducing air-conditioning control in accordance with the personal preference of each tenant. Therefore, dissatisfaction of each tenant with respect to air-conditioning can be alleviated.

In addition, according to this embodiment, since a learning operation is performed by generating intermediate layer units CU, a high-speed learning operation with respect to a neural network of a back propagation, hop field, or Bolzmann scheme can be realized. In addition, the tenant need not repeatedly perform an operation for learning processing, thereby realizing a user-friendly apparatus.

Furthermore, since no limitations are imposed on physical storage capacity in the intermediate layer 1-22 owing to the reuse of intermediate layer units, the set determining section 1-2 can be reduced in size. That is, when the set determining section 1-2 is to be incorporated in the UT 1-4, a reduction in the size of the UT 1-4 can be realized.

Moreover, according to the embodiment, since fuzzy operations are performed in the neural network of the set determining section 1-2, ample margins can be given to the output precision of a temperature sensor 3 and a humidity sensor 4. As a result, an inexpensive sensor which does not have very high measurement precision can be used, and the set position of the sensor need not coincide with a typical point of a room. That is, since input data to the set determining section 1-2 are treated as fuzzy values, the condition that input data must be accurate can be alleviated. As a result, determination performed by the set determining section 1-2 imitates determination performed by the human body with respect to a thermal environment.

[Determining Operation 2: Ninth Aspect]

Figure 17:
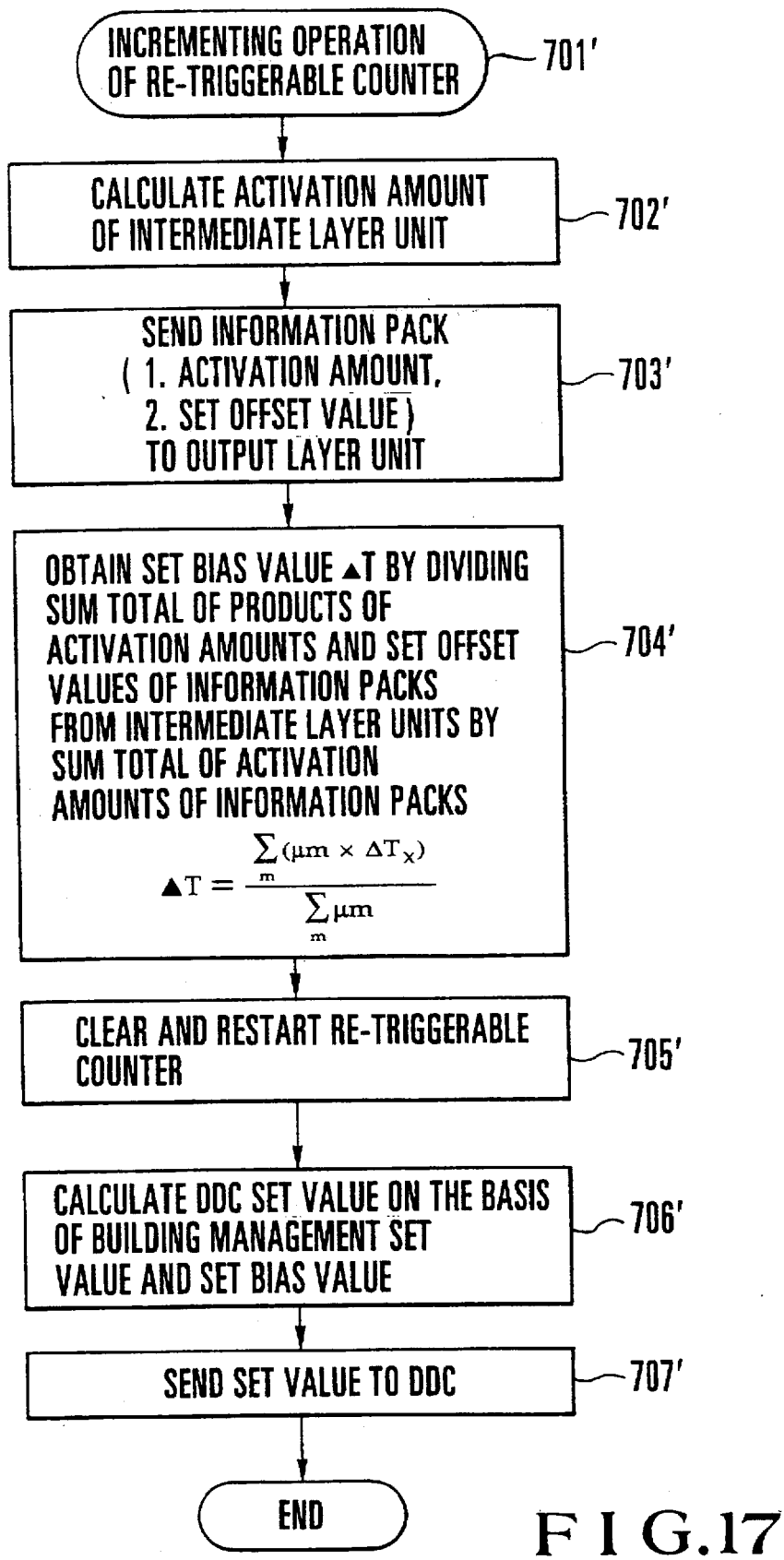
FIG. 17 is a flow chart for explaining a determining operation 1̂ in the set determining section (second embodiment)
Figure 18:
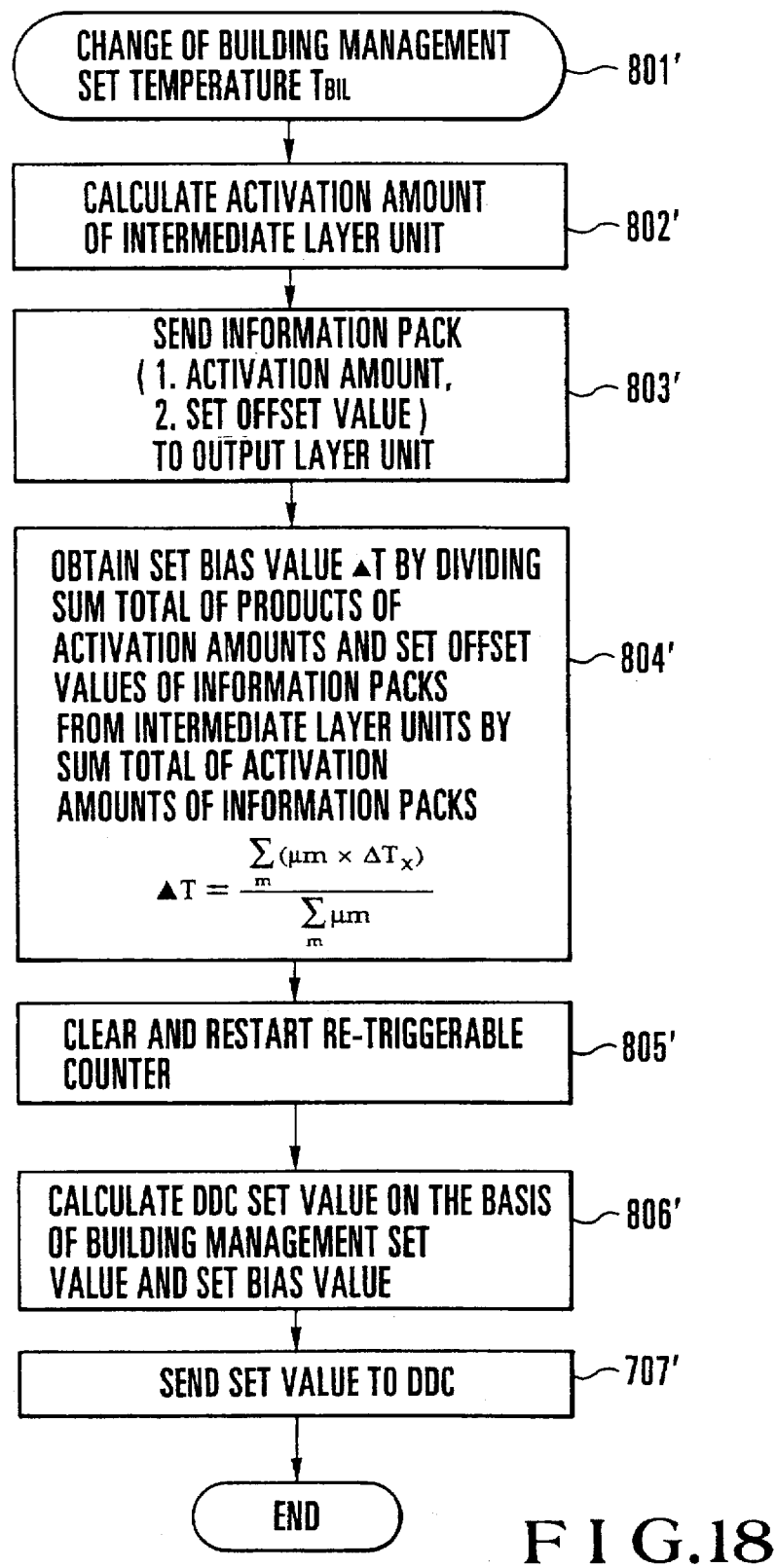
FIG. 18 is a flow chart for explaining a determining operation 2̂ in the set determining section (second embodiment)
Figure 19A:
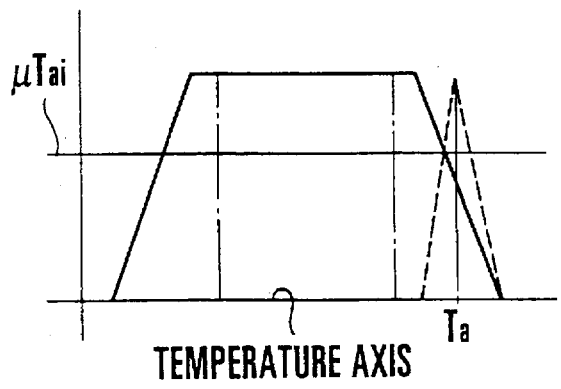
FIGS. 19(a), 19(b), 19(c), 19(d) and 19(e) are graphs showing a state wherein a fuzzy operation is performed between each input data and corresponding stored data in an intermediate layer unit.
Figure 19B:
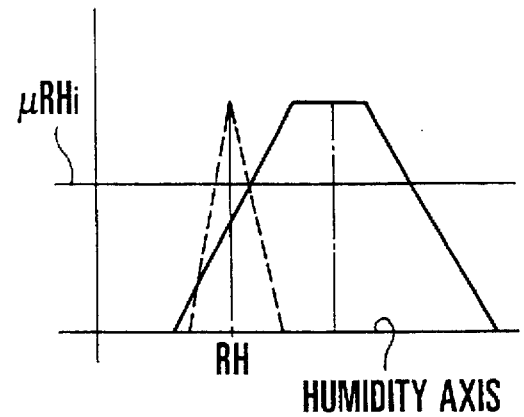
Figure 19C:
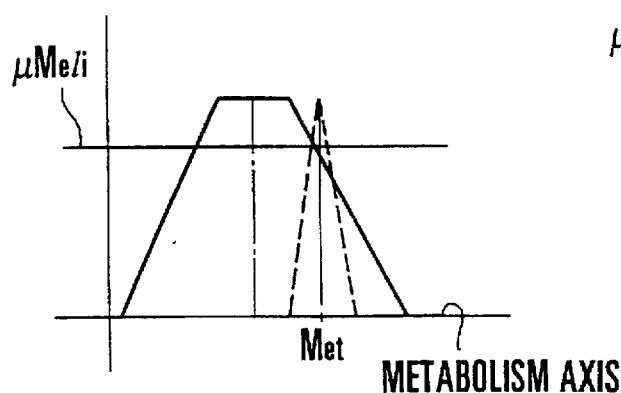
Figure 19D:
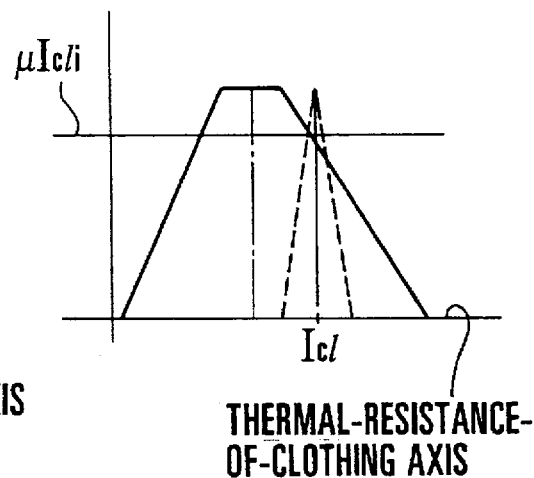
Figure 19E:
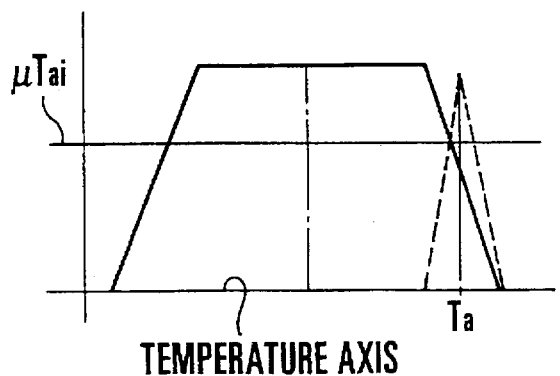
Figure 21:
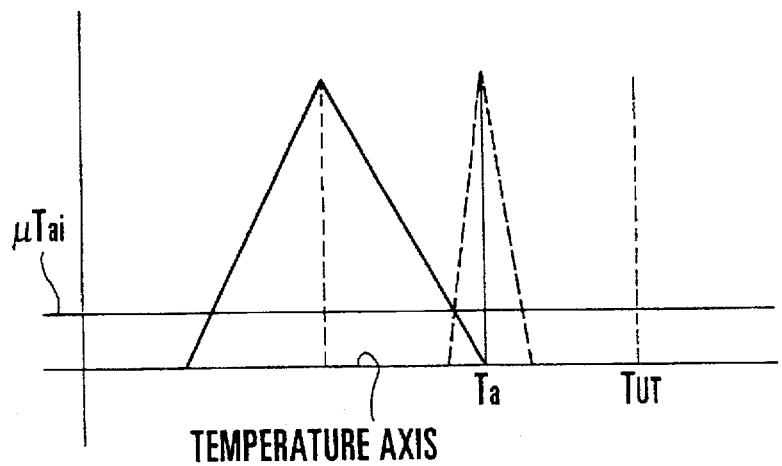
FIG. 21 is a graph showing a state wherein a triangular membership function is used, and an air-conditioning unit tries to make the indoor temperature reach a desired temperature $T_{UT}$.

In this embodiment, when the building management set temperature $T_{BIL}$ is changed (time $t_{B1}$ in FIG. 29(a); step 801' in FIG. 18), the set determining section 1-2 performs a determining operation in the same manner as in the case wherein the re-triggerable counter 1-24 is incremented (step 701' in FIG. 17). The set bias value $\blacktriangle T$ obtained by this determining operation is added to the building management set temperature $T_{BIL}$ after it is changed, and the sum is supplied, as a new air-conditioning set value, to the DDC 1-3 (time $t_{B1}$ in FIG. 29(d)).

In addition, in the embodiment, the preset metabolism values Met and the preset thermal resistances of clothing Icl, data obtained by measuring the metabolism value and human thermal resistance of clothing, which change with changes in season and time, are stored in database (not shown). A metabolism value and a thermal resistance of clothing are read out from this database to be used as preset values, respectively, in accordance with a situation. With this operation, the preset metabolism value and the preset thermal resistance of clothing are used as rhythmic data, thus allowing air-conditioning control reflecting the real indoor environment.

Furthermore, in the embodiment, if the parameters Ta, RH, Met, and Icl indicating the indoor environment, set when the tenant set temperature $T_{UT}$ is changed, and measured outdoor temperature, measured outdoor humidity, and the like indicating the outdoor environment are stored in the database together with the time point at which the tenant set temperature $T_{UT}$ is changed, and these data are processed, edited, and recorded to be arbitrarily displayed and printed, satisfaction and dissatisfaction of each tenant with respect to air-conditioning can be analyzed afterward, contributing to improvements in building maintenance.

In the embodiment, only the measured indoor temperature Ta is controlled. However, as shown in FIG. 20, the present invention can be applied to a case wherein both the measured indoor temperature Ta and the measured indoor humidity RH are treated as air-conditioning control targets, and the two targets are simultaneously controlled.

Parameters other than an air-conditioning control target, i.e., the parameters RH, Met, and Icl other than the parameter Ta, may be supplied as measured or preset values. In addition to the parameters Ta, RH, Met, and Icl, an air velocity Vair, a radiant temperature Tr, and the like as indoor environment parameters may be supplied as measured or preset values.

In the second embodiment of the set determining section 1-2, the membership function shown in FIGS. 15(a) or 15(e) is used in the place of the membership function shown in FIG. 5(a) for the following reasons.

The membership function shown in FIG. 15(a) will be described first. Referring to FIG. 15(a) a trapezoidal membership function is used to continuously control the air-conditioning unit up to the temperature $T_{UT}$ desired by the tenant because he/she is currently dissatisfied with the measured indoor temperature Ta. If a triangular membership function having the measured indoor temperature Ta as the central value is used instead of the trapezoidal membership function, the air-conditioning unit is started at the measured indoor temperature Ta. After a while, the air-conditioning unit changes the indoor temperature. However, since the membership function has no region at the desired temperature $T_{UT}$ as the target value, the indoor temperature will never reach the desired temperature $T_{UT}$, as is apparent from FIG. 21.

The air-conditioning unit controls the indoor temperature to make it approach the desired temperature $T_{UT}$. As is apparent from FIG. 21, however, as the indoor temperature approaches the desired temperature $T_{UT}$, the value of the activation amount μTai decreases. A decrease in the activation amount is equivalent to a decrease in the set bias value $\blacktriangle T$ finally supplied to the air-conditioning unit. That is, the set value supplied to the air-conditioning unit does not become the desired temperature $T_{UT}$. Consequently, the air-conditioning unit cannot make the indoor temperature reach the desired temperature $T_{UT}$.

This problem is posed only because the triangular membership function is used. Therefore, in order to keep the air-conditioning unit operating until the indoor temperature reaches the desired temperature $T_{UT}$, a trapezoidal membership function must be used. The membership function shown in FIG. 5(a) is formed on the basis of the above-described concept.

Figure 22A:
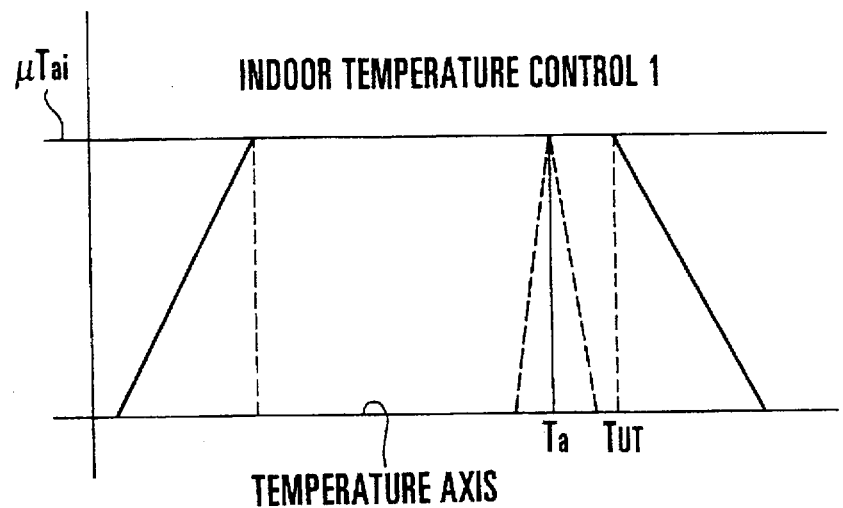
FIGS. 22(a) and 22(b) are graphs showing cases 1 and 2 of indoor temperature control.
Figure 22B:
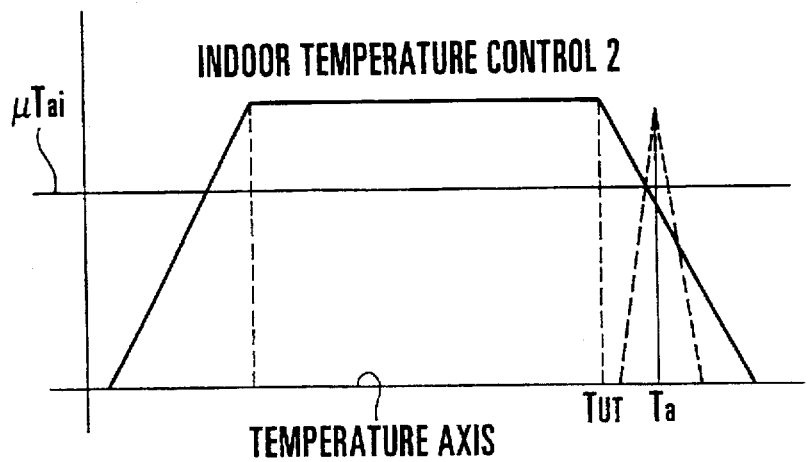

A careful examination on the actual operation of the air-conditioning unit revealed that the indoor temperature did not necessarily coincide with a set temperature as a target value. That is, the indoor temperature often deviates from the set temperature. If the indoor temperature Ta falls within an allowable range, as shown in FIG. 22(a), no problem is posed. If, however, the indoor temperature Ta falls outside the allowable range, as shown in FIG. 22(b) a problem is posed. The value of the activation amount μTai in FIG. 22(b) is smaller than that in FIG. 22(a). In this case, if another intermediate layer unit, in which another indoor temperature is stored, exhibits a large value of the activation amount μTai, this unit may be selected by the determination function because of the large activation amount. As a result, a set temperature different from the desired temperature $T_{UT}$ may be supplied to the air-conditioning unit, and the unit may control the indoor temperature in a direction to separate from the currently desired temperature $T_{UT}$.

In order to prevent this problem, the width of the membership function (trapezoidal) must be increased.

In addition, if membership functions other than the membership function of indoor temperature are also formed into trapezoidal shapes by increasing their widths, a required region can be covered with a small number of membership functions, allowing the use of a computer having a small memory capacity. That is, a reduction in cost can be achieved, and at the same time, the number of times of calculation of the activation amounts of intermediate layer units can be reduced, contributing an increase in operation speed. The computer can be used for other operations, e.g., prevention of disasters and communication, in a saved time.

The membership function shown in FIG. 15(e) will be described below. The membership function shown in FIG. 15(e) has the same structure as that of each of the trapezoidal membership functions obtained by increasing the widths of the membership functions of humidity, metabolism, and thermal resistance of clothing. This means that all the membership functions can have the same data structure in the memory.

Referring to FIG. 15(a), only the indoor temperature has a different data structure, and the desired temperature $T_{UT}$ must be sorted in addition to the indoor temperature Ta. Accordingly, a larger memory capacity is required. If the number of membership functions to be stored is basically small, problems are scarcely posed. However, as each tenant arbitrarily inputs various set temperatures, a uniform data structure which demands a small memory capacity is advantageous in storing all the input data.

In addition, the determining operation in the second embodiment is performed by fuzzy inference, i.e., "dividing sum total of the products of the activation amounts and set offset values ΔTx of information packs by the total sum of the activation amounts of the respective information packs, and using the resultant value as the final set bias value ▲T". This operation is equivalent to an operation of determining the set bias value ▲T from the average of the activation amounts of the respective intermediate layer units. Only one definite desired temperature $T_{UT}$ as in the first embodiment need not be used. This means that the membership function of each intermediate layer unit need not hold a specific desired temperature $T_{UT}$ (it is, however, apparent that each information pack still needs to have the set offset value ΔTl). It is apparent from this that the membership function of each intermediate layer unit may have the same data structure as that of other membership functions of humidity, metabolism, and thermal resistance of clothing. Furthermore, software for calculating the above parameters can be commonly used to calculate an activation amount. Otherwise, software for calculating the activation amount of indoor temperature must be prepared independently, resulting in an increase in manufacturing cost. In addition, the memory capacity occupied by the software and the memory cost increase.

For the above reasons, in the second embodiment, the membership function shown in FIG. 15(i a) or 15(e) is used in place of the membership function shown in FIG. 5(a).

[Tenth to Thirteenth Aspects]

Figure 23:
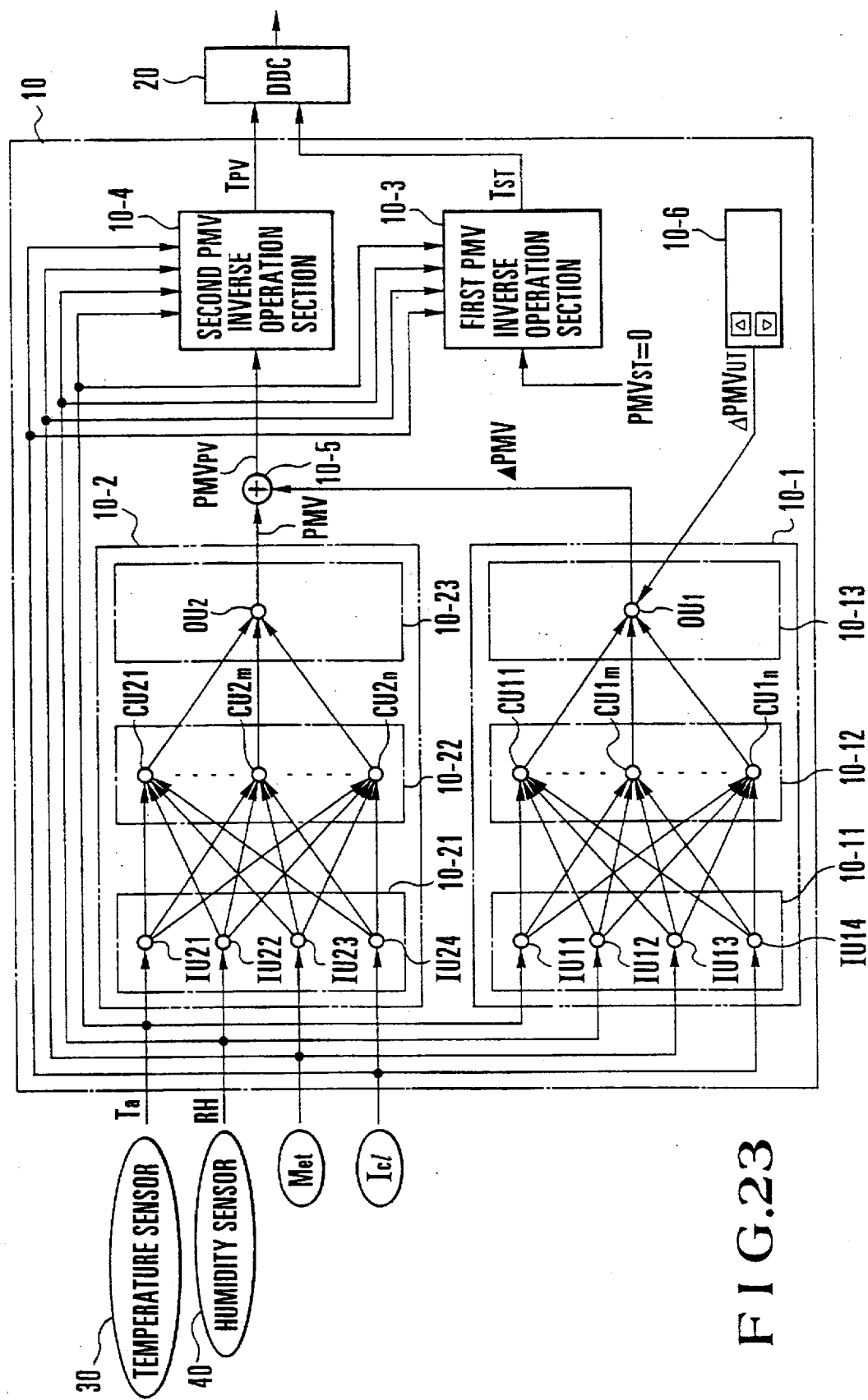
FIG. 23 is a block diagram showing an embodiment (twelfth aspect) of an air-conditioning environment measurement apparatus including a neural network operation apparatus according to the present invention.
Figure 24:
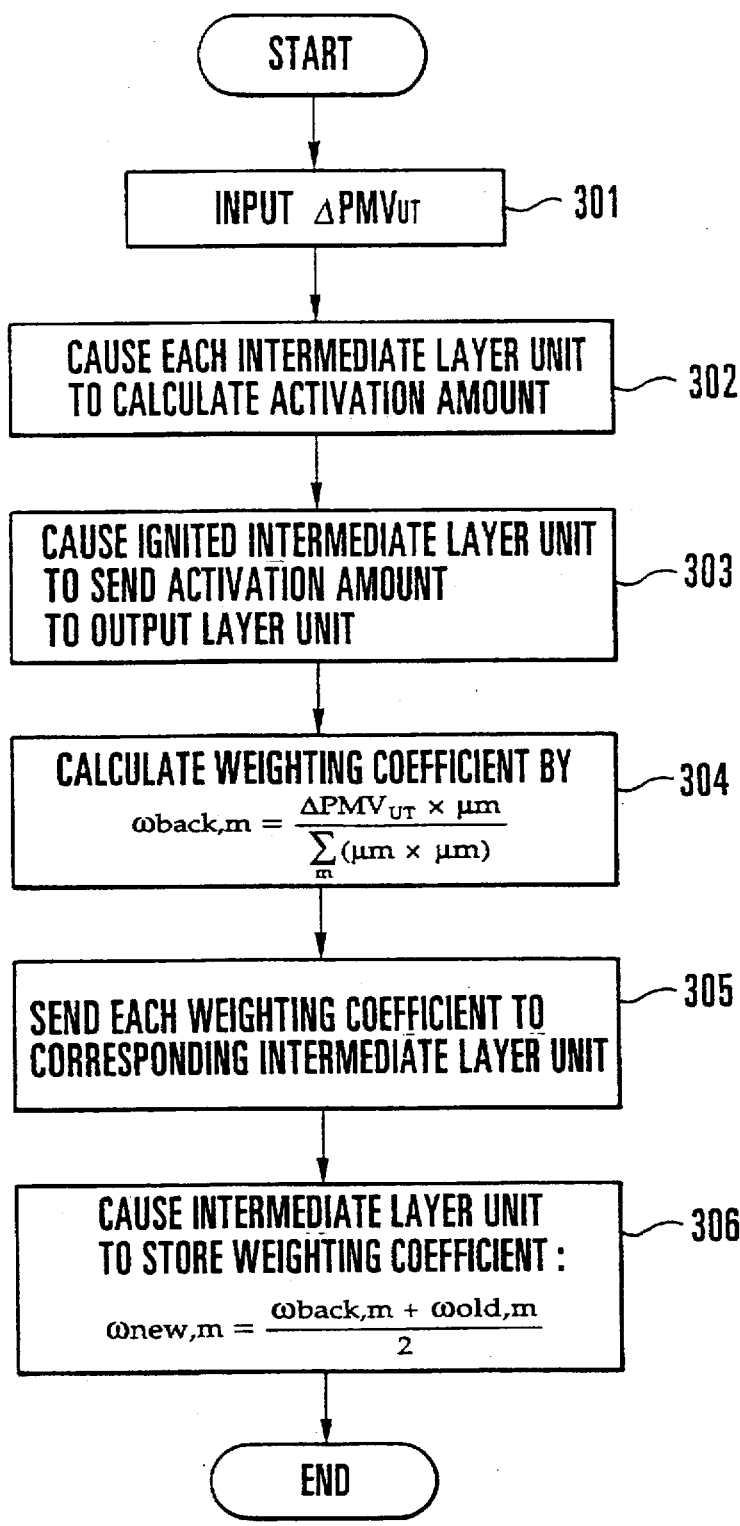
FIG. 24 is a flow chart for explaining a learning operation in the first neural network.
Figure 26:
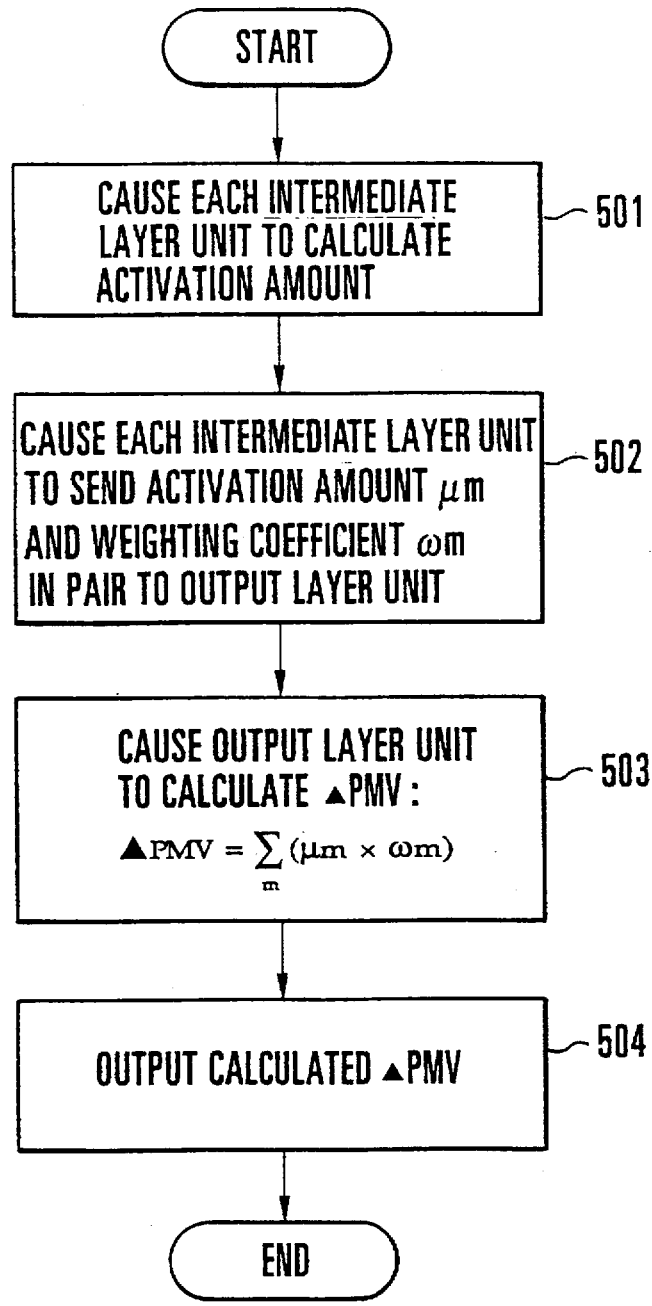
FIG. 26 is a flow chart for explaining a determining operation in the first neural network.

An air-conditioning environment measurement apparatus including a neural network operation apparatus according to the present invention will be described in detail next with reference to FIGS. 23 to 28 and 30(a) to 30(h). FIG. 23 shows an embodiment (twelfth aspect) of the air-conditioning environment measurement apparatus. Referring to FIG. 23, reference number 10-1 denotes a first neural network; 10-2, a second neural network; 10-4, a first PMV inverse operation section; 10-3, a second PMV inverse operation section; 10-5, an adder; and 10-6, a user terminal. An air-conditioning environment measurement apparatus 10 is constituted by these components. Reference numeral 20 denotes a DDC (Direct Digital Controller) as an air-conditioning controller; 30, a temperature sensor; and 40, a humidity sensor.

[First Neural Network: Tenth and Eleventh Aspects]

The first neural network 10-1 has an input layer 10-11, an intermediate layer 10-12, and an output layer 10-13. The input layer 10-11 has input layer units IU11 to IU14, to which a measured indoor temperature Ta, a measured indoor humidity RH, a preset metabolism Met, and a preset thermal resistance of clothing Icl are respectively supplied. The intermediate layer 10-12 has intermediate units $CU_{1l}$ to $CU_{1n}$, to which outputs from the input layer units IU11 to IU14 are respectively supplied. The output layer 10-13 has a single output layer unit OU1 and receives outputs from the intermediate units $CU_{1l}$ to $CU_{1n}$.

In the first neural network 10-1, the input layer units IU11 to IU14 respectively supply the measured indoor temperature Ta, the measured indoor humidity RH, the preset metabolism Met, and the preset thermal resistance of clothing Icl, as fuzzy values, i.e., triangular membership functions (see FIGS. 9(a) to 9(d)), to each intermediate layer unit.

In addition, in the first neural network 10-1, the intermediate units $CU_{1l}$ to $CU_{1n}$ are arranged in correspondence with the respective lattice points of feature spaces formed by temperature, humidity, metabolism value, and thermal-resistance-of-clothing axes which are independent of each other. Each intermediate layer unit has a triangular membership function for each axis. This triangular membership function is centered on the corresponding lattice point and has a region overlapping a triangular membership function centered on an adjacent lattice point.

Figure 27A:
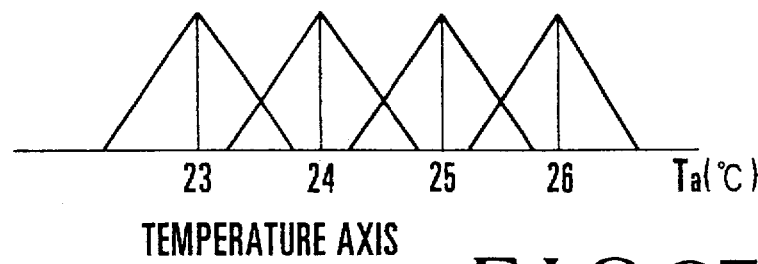
FIGS. 27(a), 27(b) and 27(c) are graphs showing triangular membership functions held in each intermediate layer unit for each axis.
Figure 27B:
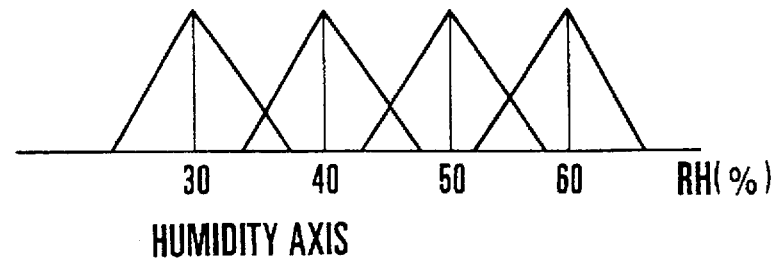
Figure 27C:
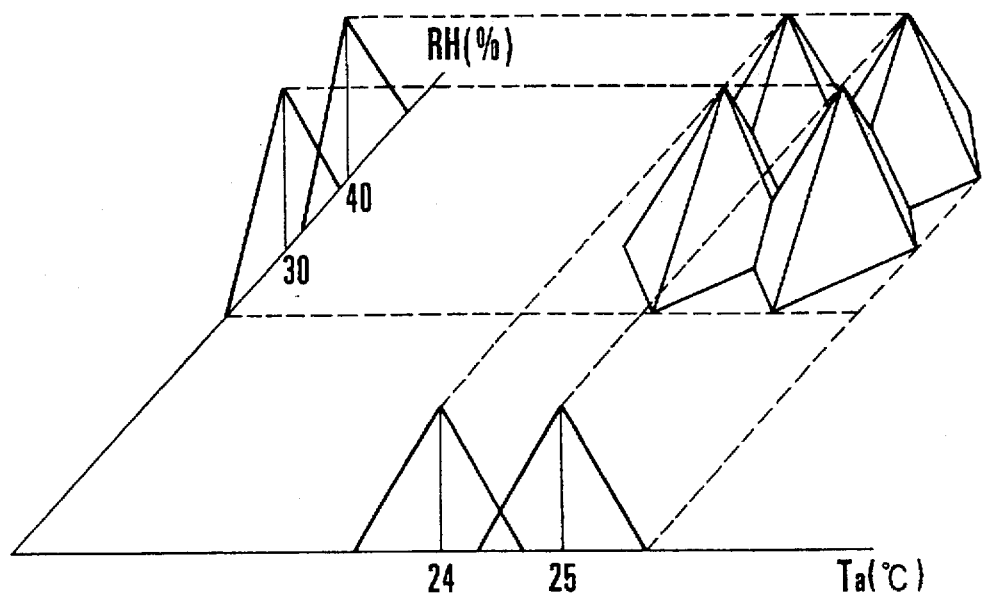

Consider the temperature and humidity axes. In this case, as shown in FIG. 27(a), an intermediate layer unit corresponding to a temperature of 24° C. has a triangular membership function centered on a temperature of 24° C. which has a region overlapping triangular membership functions centered on adjacent temperatures of 23° C. and 25° C. In addition, as shown in FIG. 27(b), an intermediate layer unit corresponding to a humidity of 40% has a triangular membership function centered on a humidity of 40%, which has a region overlapping triangular membership functions centered on adjacent humidities of 30% and 50%. Therefore, an intermediate layer unit, arranged at a lattice point where a temperature of 24° C. and a humidity of 40% intersect with each other, has a membership function obtained by synthesizing the triangular membership functions centered on a temperature of 24° C. and a humidity of 40% (see FIG. 27(c)). That is, when the temperature and humidity axes are considered, overlapping membership functions of the temperature and humidity axes are synthesized, and the membership functions of the respective intermediate layer units are shaped such that adjacent pyramids have common tail portions.

[Second Neural Network]

The second neural network 10-2 has an input layer 10-21, an intermediate layer 10-22, and an output layer 10-23. The input layer 10-21 has input layer units IU21 to IU24, to which the measured indoor temperature Ta, the measured indoor humidity RH, the preset metabolism Met, and the preset thermal resistance of clothing Icl are supplied upon branching. The intermediate layer 10-22 has intermediate layer units $CU_{2l}$ to $CU_{2n}$, to which outputs from the input layer units IU21 to IU24 are supplied, respectively. The output layer 10-23 has a single output layer unit OU2 and receives outputs from the intermediate layer units $CU_{2l}$ to $CU_{2n}$.

The second neural network 10-2 is a back propagation learning type neural network, which is disclosed by Rumelhart. In the second neural network 10-2, weighting coefficients used in the intermediate layer units $CU_{2l}$ to $CU_{2n}$ and in the output layer unit OU2 are learnt in advance so that a standard measured PMV value (complying with International Standard ISO7730) can be obtained from the output layer unit OU2.

In this embodiment, the second neural network 10-2 has a three-layered structure including one intermediate layer. However, the second neural network 10-2 may have a four-layered structure including two intermediate layers.

The operation of the air-conditioning environment measurement apparatus 10 will be described below together with the function of each component.

The second neural network 10-2 receives the measured indoor temperature Ta, the measured indoor humidity RH, and preset metabolism Met, and the preset thermal resistance of clothing Icl, and outputs a standard measured PMV value. In the adder 10-5, a PMV bias value ▲PMV (to be described later) from the first neural network 10-1 is added to this standard measured PMV value. This sum is supplied, as a measured value $PMV_{PV}$, to the second PMV inverse operation section 10-4.

The second PMV inverse operation section 10-4 receives the measured indoor temperature Ta, the measured indoor humidity RH, the preset metabolism Met, and the preset thermal resistance of clothing Icl, and performs a PMV inverse operation according to equation (6), thus converting the supplied measured value $PMV_{PV}$ into an effective temperature $T_{PV}$. The second PMV inverse operation section 10-4 then outputs the effective temperature $T_{PV}$.

$$T_{PV} = f(PMV_{PV}, Ta, RH, Icl, Met) = T_{SK} + (1.0 \quad (6)$$
$$1.466 \times Icl)/8.996 \times [(PMV_{PV}/\alpha) +$$
$$0.7808 \times T_{SK} - 0.8141 \times Met \times Ta -$$
$$(0.4067 + 0.133338 \times Met) \times Pa -$$
$$10.2895 - 49.5152 \times Met + 0.42 \times$$
$$(Met - 1) \times 58.15]$$

where α=0.303×EXP(−0.036×Met×58.15)+0.028, Tsk (skin temperature: °C.)=35.7−0.0275×Met×58.15, and Pa (vapor pressure: mmHg)=(RH/100)×EXP[18.6686−4030.183/(Ta+ 235) =(RH/100)×(0.037503×Ta²−0.3937823×Ta+ 10.035825).

The first PMV inverse operation section 10-3 receives the measured indoor temperature Ta, the measured indoor humidity RH, the preset metabolism Met, and the preset thermal resistance of clothing Icl, and performs a PMV inverse operation with $PMV_{PV}=0$ according to equation (6), thereby converting input data into a set effective temperature $T_{ST}$ which satisfies a set PMV value (building management set value) $PMV_{ST}$ ($PMV_{ST}=0$). The first PMV inverse operation section 10-3 then outputs the set effective temperature $T_{ST}$.

The effective temperature $T_{PV}$ and the set effective temperature $T_{ST}$ output from the air-conditioning environment measurement apparatus 10 are supplied to the DDC 20. As a result, air-conditioning control is performed to make the effective temperature $T_{PV}$ coincide with the set effective temperature $T_{ST}$.

Assume that the effective temperature $T_{PV}$ is equal to the set effective temperature $T_{ST}$, and the tenant feels hot or cold. In this case, the tenant operates the user terminal 10-6 to supply a PMV offset value $\Delta PMT_{UT}$ as dissatisfaction information about the current air-conditioning environment, to the first neural network 10-1 (step 301 in FIG. 24). This PMV offset value $\Delta PMV_{UT}$ is supplied as a difference (deviation), currently felt by the tenant, from the measured value $PMV_{PV}$.

[Learning Operation: Tenth Aspect]

Upon reception of the PMV offset value $\Delta PMV_{UT}$ through the user terminal 10-6 (times $t_1$, $t_2$, and $t_3$ in FIG. 30(b)), the first neural network 10-1 performs the following learning operation.

Upon receiving the PMV offset value $\Delta PMV_{UT}$ externally supplied, each intermediate layer unit calculates its own activation amount (step 302). For example, the activation amount of each intermediate layer unit is calculated as follows.

Each intermediate layer unit receives the measured indoor temperature Ta, the measured indoor humidity RH, the preset metabolism Met, and the preset thermal resistance of clothing Icl, as fuzzy values, through the input layer units IU11 to IU14. Each intermediate layer unit performs a fuzzy operation indicated by equation (7), for each axis, between each of the fuzzy values (membership functions) supplied from the input layer units IU11 to IU14 and a corresponding one of the membership functions held in each unit. That is, each intermediate layer unit performs a fuzzy operation between input data and stored data for each of the following axes: a temperature axis, a humidity axis, a metabolism value axis, and a thermal-resistance-of-clothing axis.

$$\mu im = max\{(\mu si) min(\mu min)\} \quad (7)$$

where μim is the activation amount of an axis i of an intermediate layer unit $CU_{1m}$, μsi is the membership function of the input data of the axis i, μuim is the membership function of the stored data of the axis i of the intermediate layer unit $CU_{1m}$, max is a maximizing operation, and min is a minimizing operation.

FIGS. 25(a) to 25(d) show how fuzzy operations are performed on the temperature, humidity, metabolism value and thermal-resistance-of-clothing axes, respectively. Referring to FIGS. 25(a) to 25(d), reference symbols μTam, μRHm, μMetm, and μIclm denote the activation amounts obtained for therespective axes.

An activation amount μm of each intermediate layer unit is finally obtained from the activation amount obtained for each axis according to equation (8):

$$\mu m = \mu 1m \times \mu 2m \times \mu 3m \times \mu 4m \quad (8)$$

where μ1m is μTam, μ2m is μRHm, μ3m is μMetm, and μ4m is μIclm.

Upon calculating its own activation amount in this manner, each intermediate layer unit, which has obtained the activation amount as a finite value, supplies the calculated activation amount to the output layer unit OU1 (step 303).

The output layer unit OU1 performs a calculation according to equation (9) on the basis of the activation amount μm supplied from each intermediate layer unit and the PMV offset value $\Delta PMV_{UT}$ from the user terminal 10-6 to obtain a weighting coefficient ωback, m for each intermediate layer unit which has supplied the activation amount (step 304), and sends each of the obtained weighting coefficients ωback, m to a corresponding one of the intermediate layer units (305).

$$\omega back, m = (\Delta PMV_{UT} \times \mu m) / \sum_m (\mu m \times \mu m) \tag{9}$$

The background of determining equation (9) will be described below. As will be described later, the basic function of the first neural network 10-1 is to output a PMV bias value, i.e., a PMV bias value $\blacktriangle PMV$, in a determining operation. This value $\blacktriangle PMV$ is the sum of the products of ωm and the activation amounts μm supplied from the respective intermediate layer units. The value $\Delta PMV$ is represented by equation (10):

$$\blacktriangle PMV = \sum_m (\omega m \times \mu m) \tag{10}$$

In this case, the following method of determining weighting coefficients ωm may be considered first. In this method, the weighting coefficients ωm to be learnt and stored by the respective intermediate layer units of the first neural network 10-1 are considered as the same value so that the weighting coefficients can be sent back to the intermediate layer units which are activated by the same value. The method is very simple and hence can be easily realized.

It seems, however, more practical to make the activated intermediate layer units have the weighting coefficients ωm in accordance with the magnitude of the activation amounts of the units. Therefore, the weighting coefficients ωm are determined in the following manner.

The weighting coefficient ωm is considered to be proportional to the activation amount μm. Letting A be the proportional constant, ωm=A×μm. A substitution of ωm=A×μm into the weighting coefficient ωm in equation (10) yields equation (11). From equation (11), the proportional constant A is determined as equation (12). Therefore, the weighting coefficient ωm must be expressed as equation (13).

$$\blacktriangle PMV \equiv \sum_m (A \times \mu m \times \mu m) = A \times \sum_m (\mu m \times \mu m) \tag{11}$$

$$A = \frac{\blacktriangle PMV}{\sum_m (\mu m \times \mu m)} \tag{12}$$

$$\omega m = A \times \mu m = \frac{\blacktriangle PMV \times \mu m}{\sum_m (\mu m \times \mu m)} \tag{13}$$

Note that the weighting coefficient ωback,m sent to each intermediate layer unit is proportional to the activation amount of the intermediate layer unit. That is, as the intermediate layer unit is activated, the value of the weighting coefficient ωback,m increases, and vice versa.

Each intermediate layer unit performs a calculation according to equation (14) on the basis of the sent weighting coefficient ωback,m and an old weighting coefficient ωold,m stored in each unit to obtain a new weighting coefficient ωnew,m (step 306), and stores the weighting coefficient ωnew,m as its own new weighting coefficient ωm.

$$\omega new, m = (\omega back, m + \omega old, m) / \tag{14}$$

If an intermediate layer unit holds no old weighting coefficient, i.e., is in a state before learning operation, the unit stores the sent weighting coefficient ωback,m as its own weighting coefficient ωm without performing a calculation according to equation (14) and any modification.

[Determining Operation: Eleventh Aspect]

The first neural network 10-1 is always in a determining operation state. This determining operation is performed as follows. Each intermediate layer unit calculates its own activation amount (step 501 in FIG. 26) in the same manner as in the above-described learning operation. Each intermediate layer unit then supplies its own activation amount μm and its own weighting coefficient ωm stored therein, as a pair (one-pack information), to the output layer unit OU1 (step 502). The output layer unit OU1 performs a calculation according to equation (15) on the basis of the supplied one-pack information, i.e., calculates the total sum of the products of the activation amounts μm and the weighting coefficients ωm from the respective intermediate layer units (step 503), and outputs the total sum as the PMV bias value $\blacktriangle PMV$ (see FIG. 30(c) step 504). Note that one-pack information may be supplied, as the product of the activation amount μm and the weighting coefficient ωm, from each intermediate layer unit to the output layer unit OU1.

$$\blacktriangle PMV = \sum_m (+82m \times \omega m) \tag{15}$$

Consider the PMV bias value $\blacktriangle PMV$ output from the output layer unit OU1. The PMV bias value $\blacktriangle PMV$ is obtained as the optimal value for the current air-conditioning environment on the basis of the past learning result of the PMV offset value $\Delta PMV_{UT}$ supplied, as dissatisfaction information, from the tenant.

[Twelfth Aspect]

Figure 28:
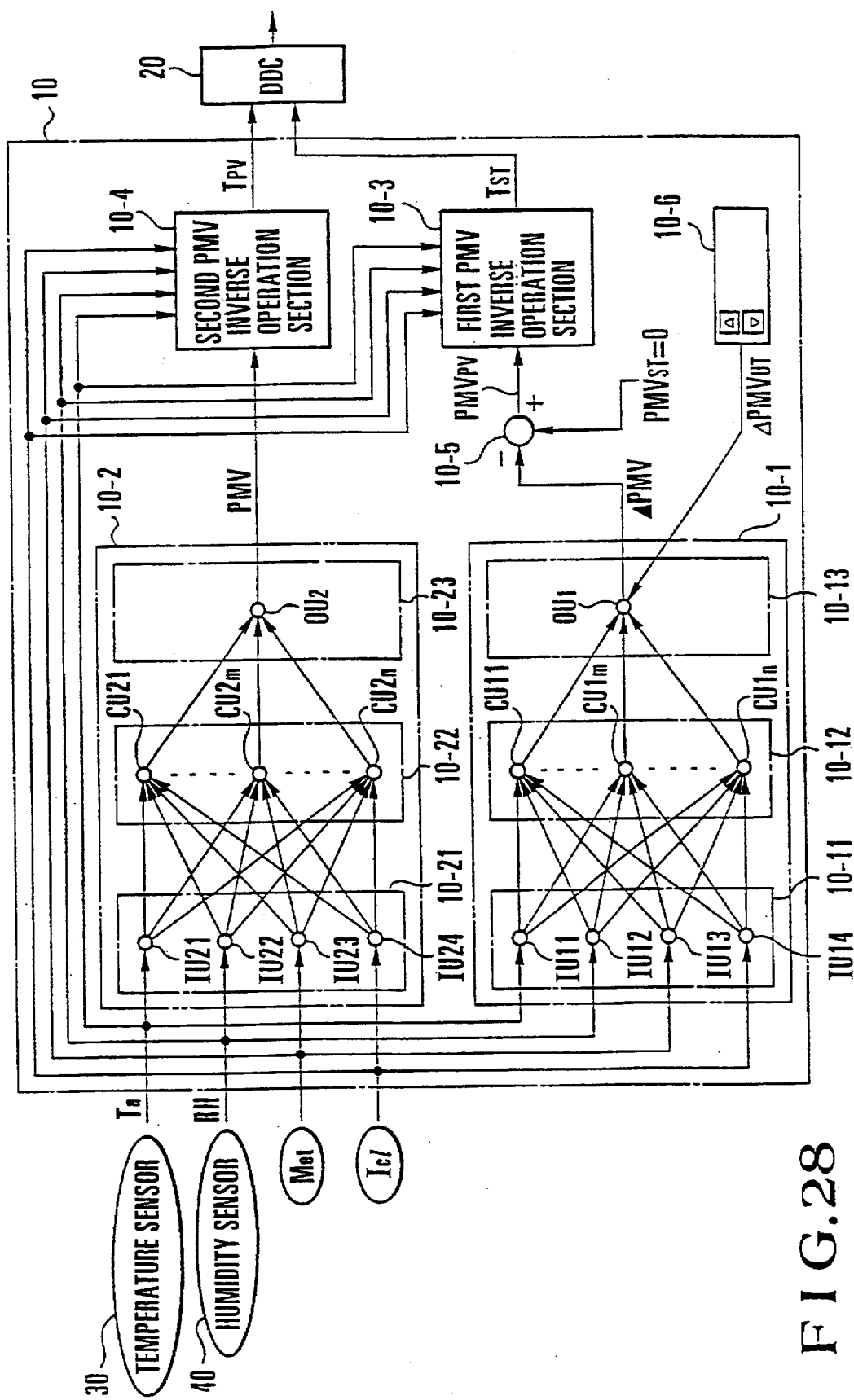
FIG. 28 is a block diagram showing another embodiment thirteenth aspect of an air-conditioning environment measurement apparatus including a neural network operation apparatus.

With reference in particular to FIG. 28, the PMV bias value $\blacktriangle PMV$ is added to a standard measured PMV value output from the second neural network 10-2 in the adder 10-5 (see FIG. 30(d)). The sum is supplied to the second PMV inverse operation section 10-4 as the measured PMV value $PMV_{PV}$ (see FIG. 30(e)) obtained in consideration of the personal preference or inclination of the tenant with respect to the air-conditioning environment. This value is then output upon conversion into the effective temperature $T_{PV}$.

The effective temperature $T_{PV}$ is supplied to the DDC 20. On the other hand, the first PMV inverse operation section 10-3 converts input data into a set effective temperature $T_{ST}$ which satisfies the PMV set value $PMV_{ST}$ ($PMV_{ST}$=0) and supplies the set effective temperature to the DDC 20 (see FIG. 30(f)). The DDC 20 performs air-conditioning control such that the effective temperature $T_{PV}$ coincides with the set effective temperature $T_{ST}$.

Note that the PMV bias value $\blacktriangle PMV$ shown in FIG. 30(c), the PMV standard measured value in FIG. 30(d), $PMV_{PV}$ shown in FIG. 30(e), and the set effective temperature $T_{ST}$ shown in FIG. 30(f) are not output as constant values, but vary depending on different conditions. To represent the variation conditions, the bias value $\blacktriangle PMV$, the PMV standard measured values, the $PMV_{PV}$, and the set effective temperature $T_{ST}$ are indicated by dotted waves in FIGS. 30(c), 30(d), 30(e), and 30(f).

According to this embodiment, therefore, the personal preference or inclination of each tenant is permanently and automatically reflected in air-conditioning control in accordance with the current air-conditioning environment, thus alleviating the dissatisfaction with air-conditioning.

In addition, according to the embodiment, since fuzzy operations are performed in the neural network of the first neural network 10-1, ample margins can be given to the output precision of a temperature sensor 30 and a humidity sensor 40. As a result, an inexpensive sensor which does not have very high measurement precision can be used, and the set position of the sensor need not coincide with a typical point of a room. That is, since input data to the first neural network 10-1 are treated as fuzzy values, the condition that input data must be accurate can be alleviated. As a result, determination performed by the first neural network 10-1 imitates determination performed by the human body with respect to a thermal environment.

The embodiment uses the neural network 10-2 which is caused to perform a learning operation in advance to obtain a standard measured PMV value. Therefore, the neural networks 10-1 and 10-2 can commonly use the temperature sensor 30 and the humidity sensor 40.

Furthermore, in the embodiment, as the preset metabolism values Met and the preset thermal resistances of clothing Icl, data obtained by measuring the metabolism value and human thermal resistance of clothing, which change with changes in season and time, are stored in database (not shown). A metabolism value and a thermal resistance of clothing are read out from this database to be used as preset values, respectively, in accordance with a situation. With this operation, the preset metabolism value and the preset thermal resistance of clothing are used as rhythmic data, thus allowing air-conditioning control reflecting the real indoor environment.

In the embodiment of FIG. 23, the PMV bias value $^\blacktriangle$PMV output from the first neural network 10-1 is added to a standard measured PMV value. However, as shown in FIG. 28 (thirteenth aspect), the PMV bias value $^\blacktriangle$PMV may be subtracted from the set PMV value PMV$_{ST}$ (PMV$_{ST}$=0) set by the first PMV inverse operation section 10-3.

The difference value PMV$_{PV}$ (see FIG. 30(g)) may be supplied to the first PMV inverse operation section 10-3 to obtain the set effective temperature T$_{ST}$ (see FIG. 30(h)).

In the embodiment, the thermal environment index is described as a PMV value. However, the index may be ET* (New Effective Temperature). In this case, since ET* is on the dimension of temperature, no inverse operation sections such as the PMV inverse operation sections 10-3 and 10-4 are required, and the sum of a standard measured ET* value and a bias ET* value, and a set ET* value are directly supplied to the DDC.

Furthermore, in the embodiment, the measured indoor temperature Ta, the measured indoor humidity RH, the preset metabolism value Met, and the preset thermal resistance of clothing Icl are supplied to the neural networks 10-1 and 10-2. In this case, if at least one of the parameters is supplied as a measured value, the remaining parameters may be supplied as measured or preset values. In addition to the parameters Ta, RH, Met, and Icl, an air velocity Vair, a radiant temperature Tr, and the like as indoor environment parameters may be supplied as measured or preset values. In this case, as is apparent, in the neural network 10-1 (10-2), input layer units for the parameters Vair and Tr are added to the input layer 10-11 (10-21), and learning and determining operations are performed by using these parameters as well as the above parameters.

Moreover, in the embodiment, a standard measured PMV value is obtained by the second neural network 10-2. However, a standard measured PMV value may be obtained by substituting the following values into equation (16) as a PMV equation:

$$PMV = F(T_{eq}, Ta, RH, Icl, Met) = \alpha \times [10.2895 + \quad (16)$$
$$49.5152 \times Met - 0.42 \times (Met - 1) \times$$
$$58.15 - 0.7808 \times T_{SK} + 0.08141 \times Met \times$$
$$Ta + (0.4067 + 0.133338 \times Met) \times Pa -$$
$$8.996/(1 + 1.466 \times Icl) \times (T_{SK} - T_{eg})]$$

for $T_{eq}$=0.45×Tr+0.55×Ta+(0.24−0.75×Vair$^{1/2}$)/(1+Icl)×(36.5−Ta)

where $T_{eq}$ is the equivalent temperature (°C.), Tr is the radiant temperature (°C.), and Vair is the air velocity (m/s).

In the embodiment, in a learning operation, each intermediate layer unit performs a calculation according to equation (14) to obtain the weighting coefficient ωnew,m, and stores the weighting coefficient ωnew,m as its new weighting coefficient ωm. However, each intermediate layer unit may store the supplied weighting coefficient ωback,m as its own weighting coefficient ωm in place of the old weighting coefficient ωold,m.

Effects of Invention

[First Aspect]

When a building manager is to decide the air-conditioning set value T$_{BIL}$, the manager confirms it by means of a simulation on the basis of the PMV index to determine the air-conditioning set value T$_{BIL}$. This decision process is scientific and systematic to reduce discomfort of tenants.

The building manager is not confused with decision of the air-conditioning set value (i.e., he decides the set value T$_{BIL}$ without uncertainty).

[Second Aspect]

Learning is performed upon formation of intermediate layer units. As compared with a back propagation or Bolzmann type neural network, learning can be performed once at high speed. Learning of the present invention can be easily handled by a tenant or building manager.

The basic learning data of the intermediate layer unit is a set offset value. Even if input data to each input layer unit is input to a region where no intermediate layer unit is present, the output layer unit has only the zero value. That is, if no learning is performed, a wrong value will not be output.

Each intermediate layer unit itself is a membership function, and input data is also a membership function. For this reason, a high-precision indoor measuring device (sensor) need not be used. In addition, the installation position of a sensor need not be the representative point of a room, either.

Even if a contradictory tenant condition (e.g., a bias value of −5° C. was given 10 minutes ago, and a bias value of +4° C. is given now although the environment is not so changed) is given, smooth learning can be performed. The intermediate layer units need not be classified into groups or classes, unlike other neural networks, thereby realizing a system in a simple mechanism.

Intrinsic numbers are assigned to the intermediate layer units, respectively. All the intermediate layer units can be distinguished from each other. Operations associated with the intermediate layer units can be more simplified. Therefore, an operation algorithm can be simplified, the manufacturing cost can be reduced, and the developing period can be shortened.

[Third Aspect]

The neural network can perform determination when a count-up operation is performed. A time required for a full-count operation can be appropriately adjusted to coincide with the air-conditioning control response time (30 or 60 minutes) of a given room.

An activation amount is obtained by a fuzzy operation and therefore can partially match with human senses. A human body does not feel temperatures as definite values such as 25° C. and 25.4° C. but feels somehow cold or hot. This decision is a fuzzy decision, which can be properly simulated by the fuzzy operation.

The set bias value ▲T finally calculated by the output layer unit is output from the intermediate layer unit having a maximum activation amount of the set offset values ΔT of the intermediate layer units whose learning has been completed. The preferences of the tenants are systematically decided to obtain this value as a more appropriate value.

The air-conditioner is operated first in accordance with conditions set by the tenant. For this reason, the tenant can be satisfied that he can manage the air-conditioner. Thereafter, the conditions are automatically corrected in accordance with the determination operations of the neural network. This correction is effective in view of energy savings.

The operation is performed by selecting only one intermediate layer unit. For this reason, the operation algorithm can be simplified, the manufacturing cost can be reduced, and the developing period can be shortened.

[Fourth Aspect]

The set value of the building manager is the basic value for air-conditioning control. When this set value is changed, the determination operation of the neural network is started to set a new set value. As a result, a simulation for satisfying the comfort of a tenant is satisfactorily performed.

A new set bias value ▲T is assumed to be a plausible value calculated upon systematic determination of the preferences of the tenants for air-conditioning.

[Fifth-Seventh Aspects]

The basic principle of the fifth to seventh inventions is the same as that of the second to fourth inventions. Even if the number of intermediate layer units to be formed is limited, the unit number is incremented in a formation order. For this reason, priority of new intermediate layer units over old intermediate layer units can continuously and properly function.

The limited memory can be efficiently utilized. Since the oldest unit is deleted, the memory does not have an apparent limit.

[Eighth Aspect]

The neural network can perform determination when a count-up operation is performed. A time required for a full-count operation can be appropriately adjusted to coincide with the air-conditioning control response time (30 or 60 minutes) of a given room.

An activation amount is obtained by a fuzzy operation and therefore can partially match with human senses. A human body does not feel temperatures as definite values such as 25° C. and 25.4° C. but feels somehow cold or hot. This decision is a fuzzy decision, which can be properly simulated by the fuzzy operation.

The set bias value ▲T finally calculated by the output layer unit is the mean value of the set offset values ΔT of the intermediate layer units whose learning has been completed. The preferences of the tenants are systematically decided to obtain this value as a more appropriate value. In addition, the offset values ΔT representing the preferences of the tenants for air-conditioning are generally different from each other and will not be skipped and selected. Data smoothing is performed in the fuzzy operation, so that a smooth operation can be performed.

The air-conditioning is operated first in accordance with conditions set by the tenant. For this reason, the tenant can be satisfied that he can manage the air-conditioner. Thereafter, the conditions are automatically corrected in accordance with the determination operations of the neural network. This correction is effective in view of energy savings.

[Ninth Aspect]

The set value of the building manager is the basic value for air-conditioning control. When this set value is changed, the determination operation of the neural network is started to set a new set value. The set bias value ▲T finally calculated by the output layer unit is the mean value of the set offset values ΔT of the intermediate layer units whose learning has been completed and is obtained upon systematic determination of the preferences of the tenants for air-conditioning, thereby obtaining a more appropriate value. In addition, the offset values ΔT representing the preferences of the tenants for air-conditioning are generally different from each other and will not be skipped and selected. Data smoothing is performed in the fuzzy operation, so that a smooth operation can be performed.

[Tenth Aspect]

Since the intermediate layer units cover the region without any gap (partial overlapping), no error occurs in the neural network. If any gap is present, the neural network cannot cope with this gap to cause a neural error. This neural network can finish learning for discomfort of tenants easier than that of other neural networks. The user need not teach a condition several tens or hundreds of times.

In addition, a spare time can be used for other works, so that a low-end CPU can be used, resulting in low cost.

[Eleventh Aspect]

A reaction taught by the user can be almost accurately reproduced and output to improve reliability and security.

A spare time can be used for other works, so that a low-end CPU can be used, resulting in low cost.

A decision operation is always performed, and output bias values are not skipped because the fuzzy operation is performed, thereby realizing smooth control.

[Twelfth & Thirteenth Aspects]

The PMV value can be almost accurately output although the number of units is 20 to 40. In general, a nonlinear function such as PMV cannot be easily calculated. That is, such a function can be output when a CPU repeatedly performs the calculation. The CPU and its software must be complicated, and a simple arrangement cannot cope with this. However, in the second neural network, although the arrangement is simple, an almost accurate PMV value can be output.

PMV inverse operations produce the effective temperature $T_{PV}$ and the set effective temperature $T_{ST}$, so that these values can be immediately given to a DDC as a process measured value and a set value, thereby facilitating the operation.

What is claimed is:

1. A set offset value learning and set bias value determining apparatus comprising:
    a set offset value learning apparatus comprising:
        a neural network having an input layer, an intermediate layer, and an output layer;
        an intermediate layer unit generation means for generating intermediate layer units in said intermediate layer in response to a command of changing an air-conditioning set value, set with respect to an air-conditioning control target, to a tenant set value;
        a set offset value storage means for causing said intermediate layer unit generated by said intermediate layer unit generation means to store a difference between a management set value, set with respect to said air-conditioning control target, and said tenant set value as a set offset value;

an intrinsic number storage means for causing said intermediate layer unit generated by said intermediate layer unit generation means to store an intrinsic number indicating an ordinal number in a sequence of generation; and a membership function storage means for causing said intermediate layer unit generated by said intermediate layer unit generation means to respectively determine and store membership functions on the basis of a measured value of said air-conditioning control target, obtained when said intermediate layer unit is generated, and a measured or preset value of other predetermined parameters; and a set bias value determining apparatus comprising:

a re-triggerable counter having a count value being cleared to zero in accordance with a command of changing said air-conditioning set value to said tenant set value;

an activation amount determination means for determining an activation amount of each said intermediate layer unit in response to an incrementing operation of said re-triggerable counter by performing a fuzzy operation between each of said membership functions stored in said intermediate layer unit and a corresponding one of said membership functions of said measured value of said air-conditioning control target, obtained at the time of said incrementing operation, and said preset value of said other predetermined parameters;

an information pack output means for outputting an information pack representing said activation amount, said set offset value, and said intrinsic number, said set offset value and said intrinsic number being stored in said intermediate layer unit;

an air-conditioning set value calculation means for selecting said set offset value of said intermediate layer unit having a maximum activation amount which has a maximum intrinsic number based on said information pack, adding said selected set offset value, as a set bias value, to said management set value, and setting a sum as a new air-conditioning set value in place of said tenant set value;

an air-conditioning set value forcible change means for forcibly changing said air-conditioning set value to said tenant set value in accordance with a change command to said tenant set value of said air-conditioning set value; and a tenant temperature preference setting and learning means for obtaining a temperature setting preferred by a tenant, said temperature setting entered into a tenant user terminal.

2. An apparatus according to claim 1, wherein said intermediate layer unit generation means generates a plurality of intermediate units said apparatus further comprising means for reusing a first intermediate layer unit having a minimum intrinsic number stored at a time point as a second intermediate layer unit is generated, when the number of said intermediate layer units generated reaches a maximum number of said intermediate layer units which can be generated.

3. A set offset value learning and set bias value determining apparatus comprising:

a set offset value learning apparatus comprising:

a neural network having an input layer, an intermediate layer, and an output layer;

an intermediate layer unit generation means for generating an intermediate layer unit in said intermediate layer in response to a command of changing an air-conditioning set value, set with respect to an air-conditioning control target, to a tenant set value;

a set offset value storage means for causing said intermediate layer unit generated by said intermediate layer unit generation means to store a difference between a management set value, set with respect to said air-conditioning control target, and said tenant set value as a set offset value;

an intrinsic number storage means for causing said intermediate layer unit generated by said intermediate layer unit generation means to store an intrinsic number indicating an ordinal number in a sequence of generation; and a membership function storage means for causing said intermediate layer unit generated by said intermediate layer unit generation means to respectively determine and store membership functions on the basis of a measured value of said air-conditioning control target, obtained when said intermediate layer unit is generated, and a measured or preset value of other predetermined parameters; and a set bias value determining apparatus comprising:

an activation amount determination means for determining an activation amount of each said intermediate layer unit in response to a command of changing said management set value by performing a fuzz operation between each of said membership functions stored in said intermediate layer unit and a corresponding one of said membership functions of a said measured value of said air-conditioning control target, obtained when said command is issued, and said preset value of said other predetermined parameters;

an information pack output means for outputting an information pack representing said activation amount, said set offset value, and said intrinsic number, said set offset value and said intrinsic number being stored in said intermediate layer unit;

an air-conditioning set value calculation means for selecting said set offset value of said intermediate layer unit with a maximum activation amount, or said set offset value of one of a plurality of said intermediate layer units each having a maximum said activation amount which has a maximum said intrinsic number based on said information pack output, adding said selected set offset value, as a set bias value, to a value obtained by changing said management set value to obtain a sum, and setting said sum as a new air-conditioning set value; and a tenant temperature preference setting and learning means for obtaining a temperature setting preferred by a tenant, said temperature setting entered into a tenant user terminal.

4. An apparatus according to claim 3, further comprising means for reusing a first intermediate layer unit, when the number of said intermediate layer units generated reaches a maximum number of said intermediate layer units which can be generated where a minimum said intrinsic number is stored at a time point, as a said intermediate layer unit to be subsequently generated.

5. A set offset value learning and set bias value determining apparatus comprising:
   a set offset value learning apparatus comprising:
      a neural network having an input layer, an intermediate layer, and an output layer;
      an intermediate layer unit generation means for generating an intermediate layer unit in said intermediate layer in response to a command of changing an air-conditioning set value, set with respect to an air-conditioning control target, to a tenant set value;
      a set offset value storage means for causing said intermediate layer unit generated by said intermediate layer unit generation means to store a difference between a management set value, set with respect to said air-conditioning control target, and said tenant set value as a set offset value; and
      a membership function storage means for causing said intermediate layer unit generated by said intermediate layer unit generation means to respectively determine and store membership functions on the basis of a measured value of said air-conditioning control target, obtained when said intermediate layer unit is generated, and the measured or preset values of other predetermined parameters; and
   a set bias value determining apparatus comprising:
      a re-triggerable counter having a count value being cleared to zero in accordance with a command of changing said air-conditioning set value to said tenant set value;
      an activation amount determination means for determining an activation amount of each said intermediate layer unit in response to an incrementing operation of said re-triggerable counter by performing a fuzzy operation between each of said membership functions stored in said intermediate layer unit and a corresponding one of said membership functions of said measured value of said air-conditioning control target, obtained at the time of said incrementing operation, and said preset values of said other predetermined parameters;
      an information pack output means for outputting an information pack representing at least said activation amount and said set offset value stored in said intermediate layer unit;
      an air-conditioning set value calculation means for obtaining a set bias value by dividing a sum total of products of said activation amounts and said set offset values of the respective information packs output from said information pack output means by a sum total of said activation amounts of said information packs, adding said set bias value to said management set value, and setting a sum as a new air-conditioning set value in place of said tenant set value;
      an air-conditioning set value forcible change means for forcibly changing said air-conditioning set value to said tenant set value in accordance with a change command to said tenant set value of said air-conditioning set value; and
      a tenant temperature preference setting and learning means for obtaining a temperature setting preferred by a tenant, said temperature setting entered into a tenant user terminal.

6. A set offset value learning and set bias value determining apparatus comprising:
   a set offset value learning apparatus comprising:
      a neural network having an input layer, an intermediate layer, and an output layer;
      an intermediate layer unit generation means for generating an intermediate layer unit in said intermediate layer in response to a command of changing an air-conditioning set value, set with respect to an air-conditioning control target, to a tenant set value;
      a set offset value storage means for causing said intermediate layer unit generated by said intermediate layer unit generation means to store a difference between a management set value, set with respect to said air-conditioning control target, and said tenant set value as a set offset value; and
      a membership function storage means for causing said intermediate layer unit generated by said intermediate layer unit generation means to respectively determine and store membership functions on the basis of a measured value of said air-conditioning control target, obtained when said intermediate layer unit is generated, and the measured or preset values of other predetermined parameters; and
   a set bias value determining apparatus comprising:
      an activation amount determination means for determining an activation amount of each said intermediate layer unit in response to a command of changing said management set value by performing a fuzzy operation between each of said membership functions stored in said intermediate layer unit and a corresponding one of said membership functions of said measured value of said air-conditioning control target, obtained when said command is issued, and said preset values of said other predetermined parameters;
      an information pack output means for outputting an information pack representing at least said activation amount and said set offset value stored in said intermediate layer unit;
      an air-conditioning set value determination means for obtaining a set bias value by dividing a sum total of products of said activation amounts and said set offset values of the respective information packs output from said information pack output means by a sum total of said activation amounts of said information packs, adding said set bias value to a value obtained by changing said management set value, and setting a new air-conditioning set value; and
      a tenant temperature preference setting and learning means for obtaining a temperature setting preferred by a tenant, said temperature setting entered into a tenant user terminal.

7. A neural network operation apparatus comprising:
   first to Nth input layer units for receiving first to Nth parameters, at least one of which serves as a measured value, wherein said first to Nth input layer units send said first to Nth parameters as a set of fuzzy values every time data indicating dissatisfaction with the air conditioning environment is present;
   intermediate layer units arranged in correspondence with a set of lattice points of a feature space formed by a set of axes of said first to Nth parameters of said first to Nth input layer units, each unit of said intermediate layer units having a membership function centered on a corresponding lattice point of said set of lattice points for each axis of said set of axes each said membership function having a region overlapping a membership function centered on an adjacent lattice point, and said intermediate layer units receiving outputs from said first to Nth input layer units each intermediate layer unit of said intermediate layer units determines an activation amount by performing a fuzzy operation between each of said membership functions held therein and a corresponding one of said membership functions of said first to Nth parameters sent as said fuzzy values from said first to Nth input layer units, and supplies said activation amount to an output layer unit;

said output layer unit for receiving outputs from said intermediate layer units said output layer unit determines a weighting coefficient for each intermediate layer unit of said intermediate layer units, which has supplied said activation amount, on the basis of said activation amount supplied from each said intermediate layer unit and an offset value of a thermal environment index, and sends said weighting coefficient to a corresponding intermediate layer unit of said intermediate layer units;

said intermediate layer unit stores and learns said weighting coefficient sent from said output layer unit as a new weighting coefficient, or stores and learns a weighting coefficient obtained by a calculation based on said weighting coefficient sent from said output layer unit and a stored weighting coefficient as said new weighting coefficient; and a tenant temperature preference setting and learning means for obtaining a temperature setting preferred by a tenant, said temperature setting entered into a tenant user terminal.

8. A neural network operation apparatus according to claim 7 further comprising a back propagation learning type neural network comprising a set of input layer units to which first to Nth parameters are branched and input, a set of intermediate layer units for receiving outputs from said input layer units, and an output layer unit for receiving outputs from said set of intermediate layer units and for outputting a standard measured value of a thermal environment index.

9. A neural network operation apparatus according to claim 7 further comprising:

a back propagation learning type neural network comprising a set of input layer units to which first to Nth parameters are branched and input, a set of intermediate layer units for receiving outputs from said set of input layer units, and an output layer unit for receiving outputs from said set of intermediate layer units and for outputting a standard measured value of a predicted mean vote (PMV) as a thermal environment index;

a first PMV inverse operation means for receiving said first to Nth parameters and a sum of a PMV bias value of said predicted mean vote from said neural network operation apparatus outside of said back propagation learning type neural network and said standard measured value of said predicted mean vote from said back propagation learning type neural network, converting said first to Nth parameters and said sum into an effective temperature by a first PMV inverse operation, and outputting said effective temperature; and a second PMV inverse operation means for receiving said first to Nth parameters and a set value of said predicted mean vote, converting said first to Nth parameters and said set value into a set effective temperature by a second PMV inverse operation, and outputting said set effective temperature.

10. A neural network operation apparatus comprising:

first to Nth input layer units for receiving first to Nth parameters at least one of which serves as a measured value, said first to Nth input layer units send said first to Nth parameters as fuzzy values every time data indicating dissatisfaction with the air-conditioning environment is present;

intermediate layer units arranged in correspondence with a set of lattice points of a feature surface formed by a set of axes of said first to Nth parameters of said first to Nth input layer units, each unit of said intermediate layer units having a membership function centered on a corresponding lattice point of said set of lattice points for each axis of said set of axes each said membership function having a region overlapping a membership function centered on an adjacent lattice point and said intermediate layer units receiving outputs from said first to Nth input layer units;

an output layer unit for receiving outputs from said intermediate layer units said output layer unit determines a weighting coefficient for each said intermediate layer unit, which has supplied said activation amount, on the basis of the activation amount supplied from said intermediate layer unit and an offset value of a thermal environment index, and sends said weighting coefficient to a corresponding intermediate layer unit of said intermediate layer units;

each intermediate layer unit of said intermediate layer units determines an activation amount by performing a fuzzy operation between each membership function of said membership functions held therein and a corresponding one of said membership functions of said first to Nth parameters sent as said fuzzy values from said first to Nth input layer units, and supplies said activation amount to said output layer unit;

said corresponding intermediate layer unit stores and learns said weighting coefficient sent from said output layer unit as a new weighting coefficient, or stores and learns a weighting coefficient obtained by a calculation based on said weighting coefficient sent from said output layer unit and a stored weighting coefficient as a new weighting coefficient;

in a normal operation, said first to Nth input layer units respectively send said input first to Nth parameters, as said fuzzy values, to said intermediate layer units;

each said intermediate layer unit determines said activation amount by performing said fuzzy operation between each of said membership functions held therein and a corresponding one of membership functions of said first to Nth parameters sent as said fuzzy values from said first to Nth input layer units, and supplies said activation amount and said stored weighting coefficient to said output layer unit;

said output layer unit determines a sum total of products of said activation amounts and said weighting coefficient sent from said intermediate layer units, and determines and outputs said sum total as a bias value of said thermal environment index; and a tenant temperature preference setting and learning means for obtaining a temperature setting preferred by a tenant, said temperature setting entered into a tenant user terminal.

11. A neural network operation apparatus according to claim 10 further comprising a back propagation learning type neural network comprising a set of input layer units to which first to Nth parameters are branched and input, a set of intermediate layer units for receiving outputs from said input layer units, and an output layer unit for receiving outputs from said set of intermediate layer units and for outputting a standard measured value of a thermal environment index.

12. A neural network operation apparatus according to claim 10 further comprising:

a back propagation learning type neural network comprising a set of input layer units to which first to Nth parameters are branched and input, a set of intermediate layer units for receiving outputs from said set of input layer units, and an output layer unit for receiving outputs from said set of intermediate layer units and for outputting a standard measured value of a predicted mean vote (PMV) as a thermal environment index;

a first PMV inverse operation means for receiving said standard measured value of said predicted mean vote from said back propagation learning type neural network and said first to Nth parameters, converting said standard measured value and said first to Nth parameters into an effective temperature by a first PMV inverse operation, and outputting said effective temperature; and a second PMV inverse operation means for receiving said first to Nth parameters and a difference between a bias value of said predicted mean vote from said neural network apparatus outside of said back propagation learning type neural network and a set value of said predicted mean vote, converting the difference and said first to Nth parameters into a set effective temperature, and outputting said set effective temperature.

13. A neural network apparatus comprising first to Nth input layer units for receiving first to Nth parameters at least one of which serves as a measured value;

intermediate layer units arranged in correspondence with a set of lattice points of a feature space formed by a set of axes of said first to Nth parameters of said first to Nth input layer units, each unit of said intermediate layer units having a membership function centered on a corresponding lattice point of said set of lattice points for each axis of said set of axes, each said membership function having a region overlapping a membership function centered on an adjacent lattice point and said intermediate layer units receiving outputs from said first to Nth input layer units, an output layer unit for receiving outputs from said intermediate layer units a tenant temperature preference setting and learning means for obtaining a temperature setting preferred by a tenant, said temperature setting entered into a tenant user terminal;

a back propagation learning type neural network comprising:
  a set of input layer units to which first to Nth parameters are branched and input;
  a set of intermediate layer units for receiving outputs from said input layer units; and
  an output layer unit for receiving outputs from said set of intermediate layer units and for outputting a standard measured value of a thermal environment index.

14. A neural network operation apparatus comprising:

first to Nth input layer units for receiving first to Nth parameters at least one of which serves as a measured value;

intermediate layer units arranged in correspondence with a set of lattice points of a feature space formed by a set of axes of said first to Nth parameters of said first to Nth input layer units, each unit of said intermediate layer units having a membership function centered on a corresponding lattice point of said set of lattice points for each axis of said set of axes, each said membership function having a region overlapping a membership function centered on an adjacent lattice point, and said intermediate layer units receiving outputs from said first to Nth input layer units;

an output layer unit for receiving outputs from said intermediate layer units;

a tenant temperature preference setting and learning means for obtaining a temperature setting preferred by a tenant, said temperature setting entered into a tenant user terminal;

a back propagation learning type neural network comprising:
  a set of input layer units to which first to Nth parameters are branched and input;
  a set of intermediate layer units for receiving outputs from said input layer units; and
  an output layer unit for receiving outputs from said set of intermediate layer units and for outputting a standard measured value of a predicted mean vote (PMV) as a thermal environment index;

wherein a PMV bias value of said predicted mean vote (PMV) is obtained as a bias value of a thermal environment index from said neural network operation apparatus outside of said back propagation learning type neural network, said PMV bias value is added to said predicted mean vote from said back propagation learning type neural network, a sum is converted into an effective temperature by a PMV inverse operation, and said effective temperature is an output.

* * * * *

UNITED STATES PATENT AND TRADEMARK OFFICE
CERTIFICATE OF CORRECTION

PATENT NO. : 5,751,916
DATED : May 12, 1998
INVENTOR(S) : Kon et al.

It is certified that error appears in the above-identified patent and that said Letters Patent is hereby corrected as shown below:

Column 5, line 64, after "Second Aspect]", kindly begin a new paragraph.

Column 6, line 61, kindly delete "$CU_{n30\ 1}$," and insert ---- $CU_{n+1}$, ----.

Column 6, line 64, kindly delete "$CU_{n-1}$," and insert ---- $CU_{n+1}$. ----.

Column 8, line 35, after "$T_{R3}$,", kindly insert ----$T_{R4}$, ----.

Column12, line 27, kindly delete "u1m," and insert ---- $\mu$1m ----.

Column 12, in equation (5), (approximately line 51), kindly delete "$\Sigma\mu m) \times \Delta Tm)$" and insert ---- $\Sigma(\mu m) \times \Delta Tm)$ ----.

Column 13, line 4, kindly delete "$tR_4$," and insert ---- $t_{R4}$, ----.

UNITED STATES PATENT AND TRADEMARK OFFICE
CERTIFICATE OF CORRECTION

PATENT NO. : 5,751,916
DATED : May 12, 1998
INVENTOR(S) : Kon et al.

It is certified that error appears in the above-identified patent and that said Letters Patent is hereby corrected as shown below:

Column 16, line 7, kindly delete "FIG. 15(i a)" and insert

---- FIG. 15(a) ----.

Column 17, line 24, kindly delete "$CU_{2i}$," and insert ---- $CU_{2l}$ ----.

Column 17, line 17, kindly delete "$CU_{2i}$," and insert ---- $CU_{2l}$ ----.

Column 17, line 20, kindly delete "$CU_{2i}$," and insert ---- $CU_{2l}$ ----.

Column 17, line 25, kindly delete "$CU_{2i}$," and insert ---- $CU_{2l}$ ----.

Column 17, in equation (6), (approximately line 56), kindly insert a space following "Icl,".

Column 18, in equation (7), (approximately line 50), kindly delete "$\mu im = max\{(\mu si) min(\mu min)\}$" and insert ---- $\mu im = max\{(\mu si) min(\mu uim)\}$ ----.

Column 18, line 62, kindly delete "therespective" and insert

---- the respective ----.

UNITED STATES PATENT AND TRADEMARK OFFICE
CERTIFICATE OF CORRECTION

PATENT NO. : 5,751,916
DATED : May 12, 1998
INVENTOR(S) : Kon et al.

It is certified that error appears in the above-identified patent and that said Letters Patent is hereby corrected as shown below:

Column 19, line 11, kindly delete the space between "ωback," and "m".

Column 20, in equation (14), (approximately line 4), kindly delete "ωnew,m-(ωback, m+ωold,m)/" and insert ---- ωnew,m = (ωback,m + ωold,m) / 2 ----.

Column 20, in equation (15), (approximately line 30), kindly delete "$\Delta PMV = \sum_m (+82m \times \omega m)$" and insert ---- $\Delta PMV = \sum_m (\mu m \times \omega m)$ ----.

Column 25, line 61, after "units", kindly insert a comma ---- , ----.

Column 26, line 35, kindly delete "fuzz" and insert ---- fuzzy ----.

Column 29, line 1, after "axes", kindly insert a comma ---- , ----.

UNITED STATES PATENT AND TRADEMARK OFFICE
CERTIFICATE OF CORRECTION

PATENT NO. : 5,751,916
DATED : May 12, 1998
INVENTOR(S) : Kon et al.

It is certified that error appears in the above-identified patent and that said Letters Patent is hereby corrected as shown below:

Column 29, line 5, after "units", kindly insert a comma ---- , ----.

Column 29, line 14, after "units", kindly insert a comma ---- , ----.

Column 29, line 35, after "comprising", kindly remove the paragraph indentation.

Column 30, line 12, kindly delete "surface" and insert ---- space ----.

Column 30, line 17, after "axes", kindly insert a comma ---- , ----.

Column 30, line 19, after "point", kindly insert a comma ---- , ----.

Column 30, line 23, after "units", kindly insert a comma ---- , ----.

Column 30, line 67, after "comprising", kindly remove the paragraph Indentation.

Column 31, line 36, after "comprising", kindly insert a colon ---- : ----.

Column 31, line 50, after "units", kindly delete the comma " , " and insert a semi-colon ---- ; ----.

UNITED STATES PATENT AND TRADEMARK OFFICE
CERTIFICATE OF CORRECTION

PATENT NO.　：5,751,916
DATED　　　：May 12, 1998
INVENTOR(S)：Kon et al.

It is certified that error appears in the above-identified patent and that said Letters Patent is hereby corrected as shown below:

Column 31, line 52, after "units", kindly insert a semi-colon ---- ; ----.

Signed and Sealed this

Twenty-second Day of December, 1998

Attest:

BRUCE LEHMAN

Attesting Officer　　　　Commissioner of Patents and Trademarks